(12) United States Patent
Sawada et al.

(10) Patent No.: US 12,711,621 B2
(45) Date of Patent: Aug. 18, 2026

(54) CELL IMAGE ANALYSIS METHOD

(71) Applicant: SHIMADZU CORPORATION, Kyoto (JP)

(72) Inventors: Ryuji Sawada, Kyoto (JP); Shuhei Yamamoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 326 days.

(21) Appl. No.: 18/567,494

(22) PCT Filed: Jul. 26, 2022

(86) PCT No.: PCT/JP2022/028777
§ 371 (c)(1),
(2) Date: Dec. 6, 2023

(87) PCT Pub. No.: WO2023/008428
PCT Pub. Date: Feb. 2, 2023

(65) Prior Publication Data
US 2024/0370998 A1 Nov. 7, 2024

(30) Foreign Application Priority Data
Jul. 29, 2021 (JP) ................................ 2021-124772

(51) Int. Cl.
*G06T 7/00* (2017.01)
*G06T 7/143* (2017.01)

(52) U.S. Cl.
CPC ............ *G06T 7/0012* (2013.01); *G06T 7/143* (2017.01); *G06T 2207/10056* (2013.01);
(Continued)

(58) Field of Classification Search
CPC ......... G06T 7/00; G06T 7/0012; G06T 7/143; G06T 2207/10056; G06T 2207/20076;
(Continued)

(56) References Cited

U.S. PATENT DOCUMENTS 10,204,283 B2 * 2/2019 Tate ....................... G06V 10/26
11,017,255 B2 * 5/2021 Lee ....................... G06V 10/25
(Continued)

FOREIGN PATENT DOCUMENTS

CA 2607217 A1 * 11/2006 ............ C12M 41/48
CN 109671049 A * 4/2019 ........... G06T 7/0012
(Continued)

OTHER PUBLICATIONS

International Search Report for PCT/JP2022/028777 dated Oct. 18, 2022 (PCT/ISA/210).
(Continued)

*Primary Examiner* — Stephen R Koziol
*Assistant Examiner* — Benedict E Lee
(74) *Attorney, Agent, or Firm* — Sughrue Mion, PLLC

(57) ABSTRACT

A cell image analysis method according to this invention includes a step of acquiring a cell image (10) including a cell (90); a step of inputting the cell image to a learned model (6) that has learned classification of the cell into one of two or more types; a step of acquiring an index value (20) indicating accuracy of the classification of the cell that is included in the cell image into one of two or more types based on an analysis result of each of pixels of the cell image output from the learned model; and a step of displaying the acquired index value.

11 Claims, 14 Drawing Sheets

(52) U.S. Cl.
CPC ............... *G06T 2207/20076* (2013.01); *G06T 2207/20081* (2013.01); *G06T 2207/20084* (2013.01); *G06T 2207/30024* (2013.01)

(58) Field of Classification Search
CPC . G06T 2207/20081; G06T 2207/20084; G06T 2207/30024; C12M 1/34; C12Q 1/02
See application file for complete search history.

(56) References Cited

U.S. PATENT DOCUMENTS

| | | | | |
|---|---|---|---|---|
| 11,276,000 | B2 * | 3/2022 | Yamada | G06V 10/44 |
| 2006/0193520 | A1 * | 8/2006 | Mita | G06V 40/165 382/190 |
| 2013/0251260 | A1 * | 9/2013 | Aerts | G06T 7/11 382/173 |
| 2020/0184637 | A1 | 6/2020 | El-Zehiry et al. | |
| 2020/0293934 | A1 * | 9/2020 | Ji | G16B 45/00 |
| 2021/0019580 | A1 | 1/2021 | Sakane | |
| 2021/0133963 | A1 | 5/2021 | Takahashi et al. | |
| 2022/0148282 | A1 | 5/2022 | Takahashi | |
| 2022/0189149 | A1 | 6/2022 | Shiraishi | |
| 2022/0215543 | A1 | 7/2022 | Inoue et al. | |

FOREIGN PATENT DOCUMENTS

| | | | | |
|---|---|---|---|---|
| CN | 111739017 | A * | 10/2020 | G06F 18/214 |
| CN | 112951427 | A * | 6/2021 | G06F 18/214 |
| JP | 5740101 | B2 * | 6/2015 | C12M 41/14 |
| JP | 6332937 | B2 * | 5/2018 | G06V 20/10 |
| JP | 2019195304 | A * | 11/2019 | G06N 3/08 |
| JP | 2020093076 | A * | 6/2020 | A61B 3/10 |
| JP | 2020-531971 | A | 11/2020 | |
| JP | 2021-018459 | A | 2/2021 | |
| KR | 101995294 | B1 * | 7/2019 | G06F 16/50 |
| WO | 2019/171546 | A1 | 9/2019 | |
| WO | 2020/241772 | A1 | 12/2020 | |
| WO | 2021/009906 | A1 | 1/2021 | |
| WO | 2021/059572 | A1 | 4/2021 | |

OTHER PUBLICATIONS

Written Opinion for PCT/JP2022/028777 dated Oct. 18, 2022 (PCT/ISA/237).

Communication dated Dec. 17, 2024 from the Japanese Patent Office in Application No. 2023-538552.

* cited by examiner

SUPERIMPOSED CELL IMAGE (IN-FOCUS)
FIG.7A
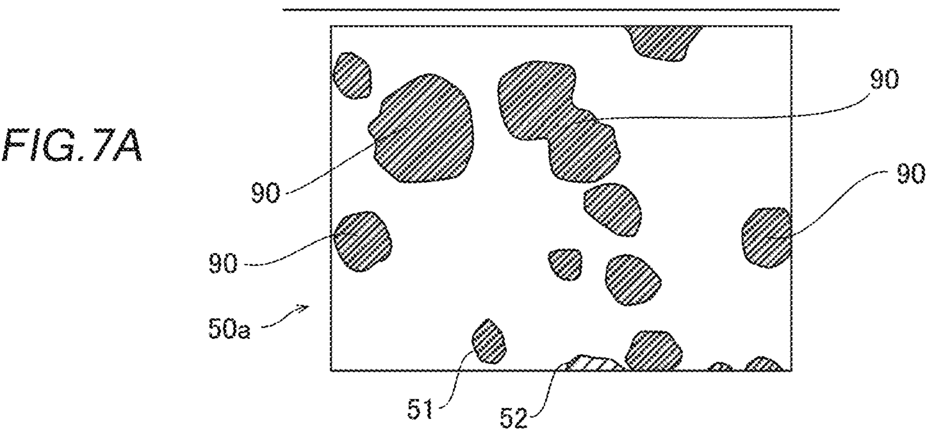
SUPERIMPOSED CELL IMAGE (OUT-OF-FOCUS -1)
FIG.7B
52
90
90
53
90
90
50b
51
90
SUPERIMPOSED CELL IMAGE (OUT-OF-FOCUS -2)
FIG.7C
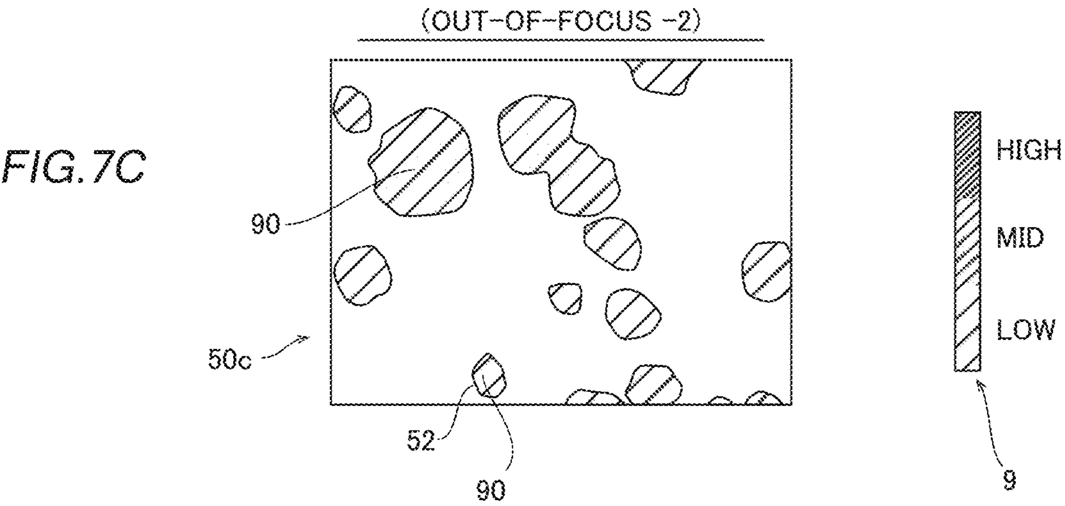

FIG.12A
FIG.12B
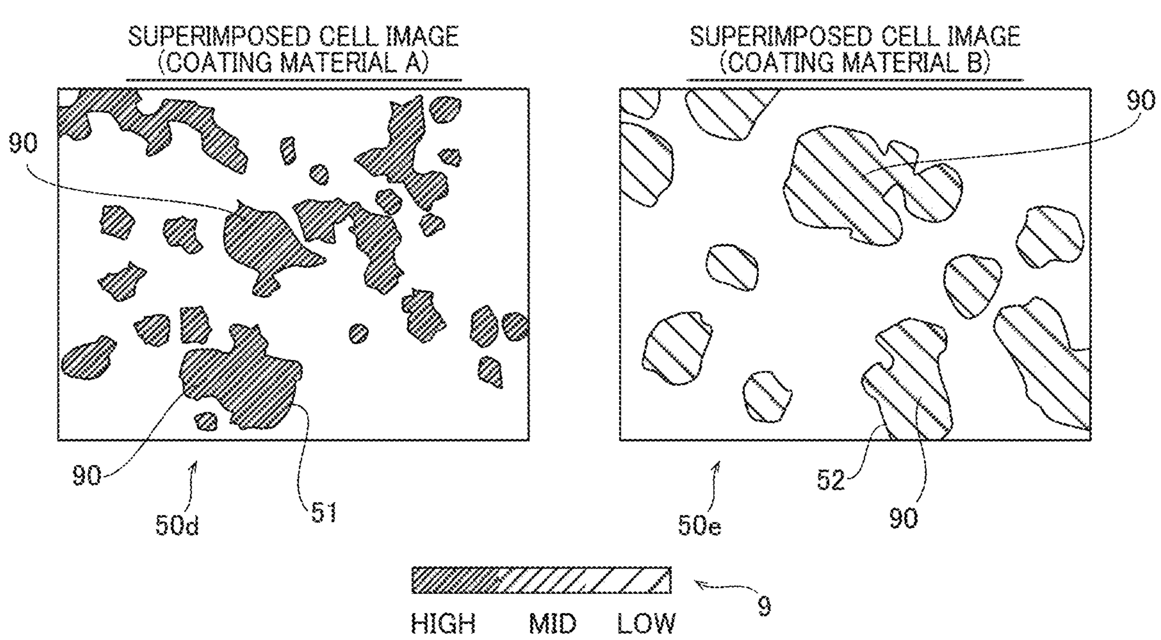
FIG.13
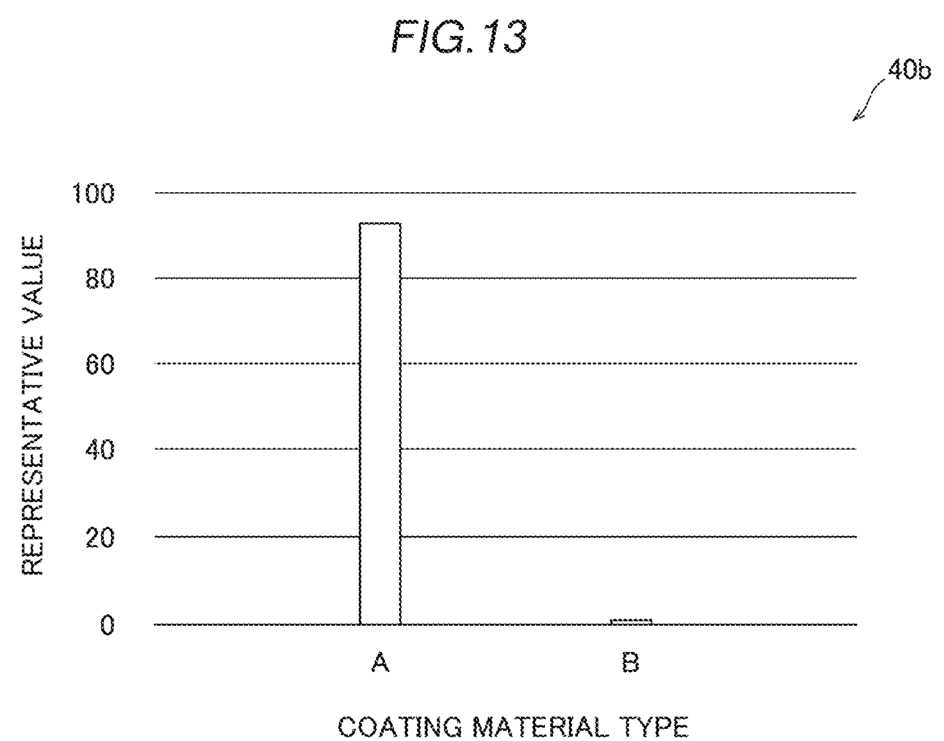

FIG. 14A

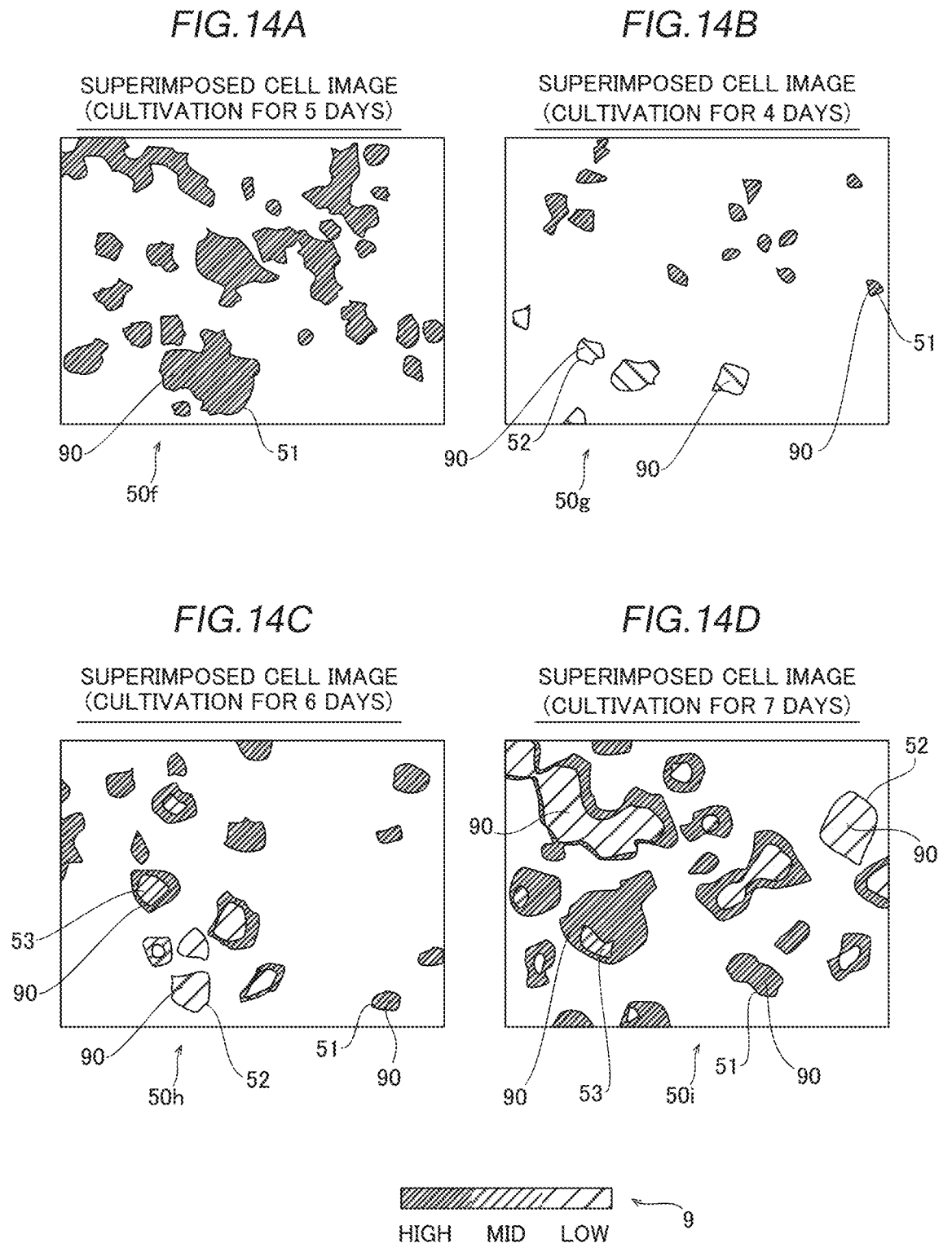

SUPERIMPOSED CELL IMAGE (CULTIVATION FOR 5 DAYS)

SUPERIMPOSED CELL IMAGE (CULTIVATION FOR 4 DAYS)

SUPERIMPOSED CELL IMAGE (CULTIVATION FOR 6 DAYS)

SUPERIMPOSED CELL IMAGE (CULTIVATION FOR 7 DAYS)

52 90 90 90 53 50i 51 90

HIGH MID LOW 9

CELL IMAGE ANALYSIS METHOD

TECHNICAL FIELD

The invention relates to a cell image analysis method, in particular to a cell analysis method for analyzing cells by using a learned model.

BACKGROUND ART

Cell analysis methods for analyzing cells by using a learned model are known in the art. Such a cell analysis method is disclosed in International Publication No. WO 2019-171546, for example.

International Publication No. WO 2019-171546 discloses a cell image analysis method for analyzing images of cells captured by an imaging apparatus. Specifically, International Publication No. WO 2019-171546 discloses a configuration in which images of cells cultivated on a cultivation plate are captured by an imaging device such as a microscope whereby acquiring cell images. The analysis method for analyzing cell images disclosed in International Publication No. WO 2019-171546 classifies the cells in the cell image into normal and abnormal cells based on analysis results of the learned model. Also, International Publication No. WO 2019-171546 discloses a configuration in which each cell is classified by segmentation for classifying each of pixels of the cell into one of categories.

PRIOR ART

Patent Document

Patent Document 1: International Publication No. WO 2019-171546

SUMMARY OF THE INVENTION

Problems to be Solved by the Invention

Although not stated in International Publication No. WO 2019-171546, in a case in which cells captured in a cell image are classified based on analysis results of a learned model, each pixel is classified according to the highest value of an analysis result of the pixel. However, if a cell is classified according to its highest value, the same result is obtained irrespective of whether a difference between the highest value and the second highest value is small or not. In other words, in a case in which a cell captured in a cell image are classified, the same result is obtained based on the highest value of its analysis result irrespective of whether accuracy of classification is high or not. For this reason, user cannot easily immediately grasp accuracy of classification of cells in the cell image when viewing the cell image. Accordingly, it is desired to allow a user to easily grasp accuracy of classification of a cell in a cell image in a cell image analysis method.

The present invention is intended to solve the above problem, and one object of the present invention is to provide a cell image analysis method capable of allowing a user to easily grasp accuracy of classification of a cell in a cell image.

Means for Solving the Problems

In order to attain the aforementioned object, a cell image analysis method according to an aspect of the present invention includes a step of acquiring a cell image(s) including a cell(s); a step of inputting the cell image to a learned model that has learned classification of the cell into one of two or more types; a step of acquiring an index value indicating accuracy of the classification of the cell that is included in the cell image into one of two or more types based on an analysis result of each of pixels of the cell image output from the learned model; and a step of displaying the acquired index value.

Effect of the Invention

In the cell image analysis method according to the aforementioned aspect, as discussed above, a step of acquiring an index value indicating accuracy of the classification of the cell image into one of two or more types based on an analysis result of each of pixels of the cell image output from the learned model; and a step of displaying the acquired index value are included. Consequently, because the index value indicating accuracy of the classification of the cell that is included in the cell image into one of two or more types is displayed, users can easily grasp a probability of classification of a cell in a cell image by seeing the index value. Therefore, it is possible to provide a cell image analysis method capable of allowing users to easily grasp a probability of classification of a cell in a cell image.

BRIEF DESCRIPTION OF THE DRAWINGS

FIGS. 7(A) to 7(C) are schematic views illustrating superimposed cell images generated by a superimposed cell image generator according to the embodiment.

FIGS. 12(A) and 12(B) are schematic views illustrating different superimposed cell images representing difference between coating materials of a cultivation container for culturing cells.

FIG. 13 is a schematic diagram illustrating difference in the numerical data of representative values of probability values caused by different coating materials.

FIGS. 14(A) to 14(D) are schematic views illustrating different superimposed cell images representing difference among the numbers of cultivation days of cells.

MODES FOR CARRYING OUT THE INVENTION

Embodiments embodying the present invention will be described with reference to the drawings.

A configuration of a cell image analysis apparatus 100 according to an embodiment is now entirely described with reference to FIG. 1.

(Configuration of Cell Image Analysis Apparatus)

Figure 1:
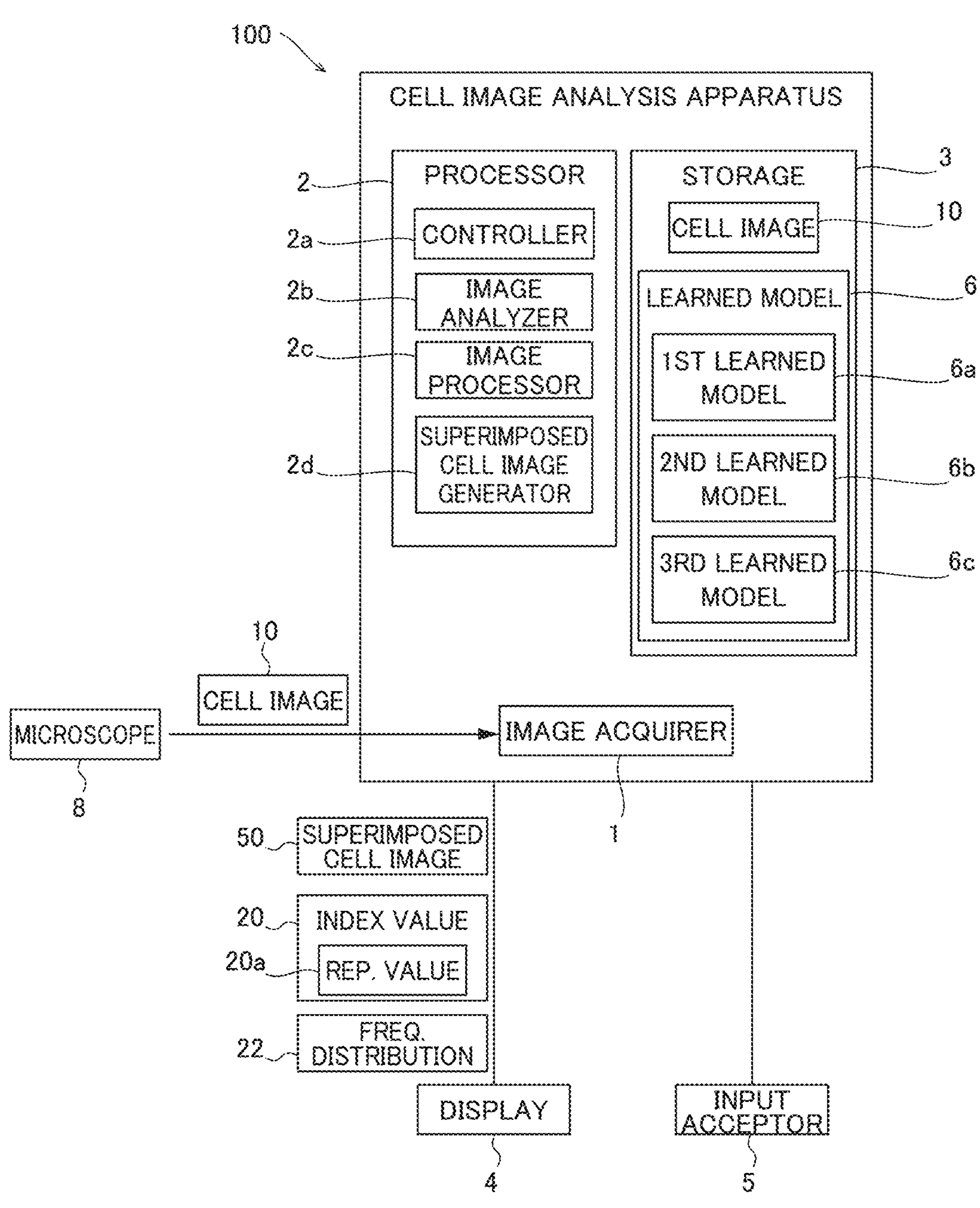
FIG. 1 is a schematic diagram entirely showing a configuration of a cell image analysis apparatus according to an embodiment.

The cell image analysis apparatus 100 includes an image acquirer 1, a processor 2, a storage 3, display 4, and an input acceptor 5 as shown in FIG. 1.

The image acquirer 1 is configured to acquire cell images 10. Each cell image 10 includes cells 90 (see FIG. 2). Specifically, the cell image 10 is an image including cultivated cells 90 cultivated in a cultivation container 80 (see FIG. 3) filled with cultivation solution 81 (see FIG. 3). In this embodiment, the image acquirer 1 is configured to acquire the cell image 10 from a device that is configured to capture the cell image 10 such as a microscope 8 to which an imaging apparatus is attached, for example. The image acquirer 1 includes an input/output interface, for example.

The processor 2 is configured to analyze the acquired cell images 10. The processor 2 can include a CPU (Central Processing Unit), a ROM (Read Only Memory), a RAM (Random Access Memory), a graphics processing unit (GPU), a field-programmable gate array (FPGA) configured for image processing, etc. Also, the processor 2, is constructed of a CPU as hardware, etc., includes a controller 2*a*, an image analyzer 2*b*, an image processor 2*c* and a superimposed cell image generator 2*d* as functional blocks of software (programs). The processor 2 can serve as the controller 2*a*, the image analyzer 2*b*, the image processor 2*c*, and the superimposed cell image generator 2*d* by executing programs stored in the storage 3. The controller 2*a*, the image analyzer 2*b*, the image processor 2*c*, and the superimposed cell image generator 2*d* may be individually constructed of a dedicated processor (processing circuit) as hardware.

The controller 2*a* is configured to control the cell image analysis apparatus 100. The controller 2*a* is also configured to acquire index values 20 indicating accuracy of classification of the cells 90 that are included in the cell image 10 into one of two or more types. Specifically, the controller 2*a* is configured to acquire representative values 20*a* of probability values 21 obtained based on the probability values 21 (see FIG. 4) output by a learned model 6 as the index value 20. The index values 20 are real values indicating accuracy of classification of the cells 90 that are included in the cell image 10 into one of two or more types. In this embodiment, each index value 20 falls within a range 0 to 100. In this embodiment, the controller 2*a* outputs one cell image 10 with one index value 20.

More specifically, the controller 2*a* is configured to obtain an index value(s) 20 of at least one of classification of the cell whether a focus of the cell image 10 is correct when the cell image is captured, classification of the cell whether a coating material on the cultivation container 80 (see FIG. 3) of the cell is proper, and classification of the cell whether the number of cultivation days of the cell is proper is acquired. The probability value 21 is an estimation value of the classification output by the learned model 6 as an analysis result. As a result of analysis, the learned model 6 is configured to output the probability value 21 for every pixel of the cell image 10.

Also, the controller 2*a* is configured to direct the display 4 to display a superimposed cell image 50. A configuration in which the index value 20 is acquired by the controller 2*a*, and the details about the superimposed cell image 50 will be described later.

In this embodiment, the image analyzer 2*b* is configured to classify each cell 90 (see FIG. 2) into one of two or more types. Specifically, the image analyzer is configured to use the learned model 6, which has learned classification of the cell 90 into one of two or more types, to classify the cells 90 that are included in the cell image 10 into one of two or more types. The learned model 6 includes a first learned model 6*a*, a second learned model 6*b* and a third learned model 6*c*, which are configured to classify the cells into one of two or more types that relate to imaging and cultivation conditions. Normal cells, abnormal cells, the first learned model 6*a*, the second learned model 6*b*, and the third learned model 6*c* will be described in detail later.

The image processor 2*c* is configured to generate a probability distribution image 12 (see FIG. 6), which will be described later. Also, the image processor 2*c* is configured to acquire cell areas that are areas of the cells 90 in the cell image 10 based on the probability distribution image 12. A configuration in which the probability distribution image 12 is generated by the image processor 2*c*, and a configuration in which the cell areas are acquired by the image processor will be described in detail later.

The superimposed cell image generator 2*d* is configured to generate the superimposed cell image 50 by superimposing a distribution of probabilities 21 (see FIG. 4) on the cell image 10. A configuration in which the superimposed cell image 50 is generated by the superimposed cell image generator 2*d* will be described in detail later.

The storage 3 is configured to store the cell images 10, the first learned model 6*a*, the second learned model 6*b*, and the third learned model 6*c*. Also, the storage 3 is configured to store various programs to be executed by the processor 2. The storage 3 includes an HDD (Hard Disk Drive) or a storage such as SSD (Solid State Drive), for example.

The display 4 is configured to display the superimposed cell image 50 generated by the superimposed cell image generator 2*d*, the index values 20, and the frequency distribution 22. The display 4 includes a display device such as an LCD monitor, for example.

The input acceptor 5 is configured to accept operating inputs from a user. The input acceptor 5 includes an input device such as a computer mouse, keyboard, etc., for example.

(Cell Image)

Figure 2:
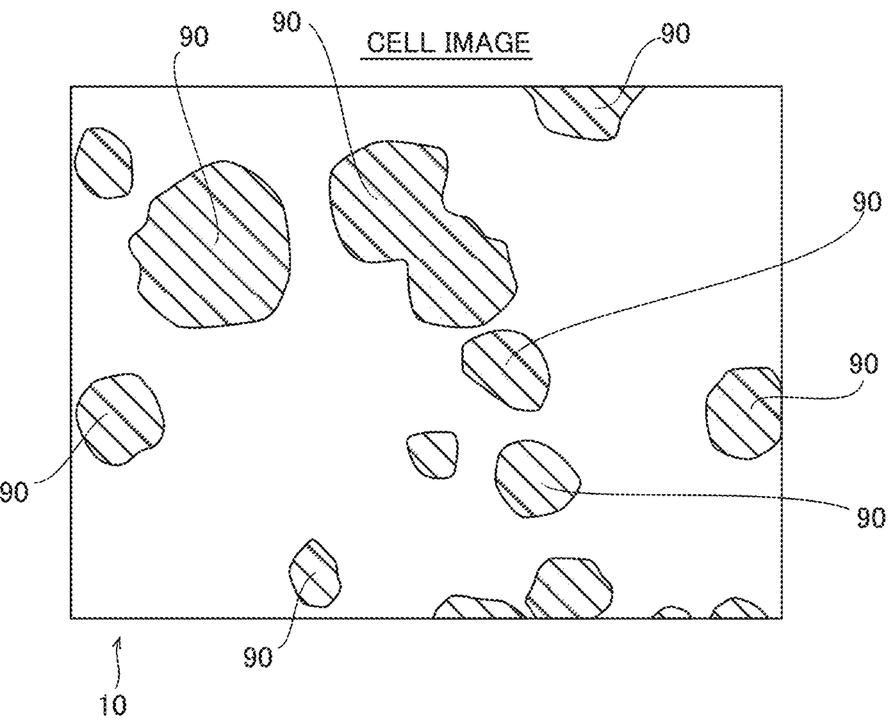
FIG. 2 is a schematic view illustrating a cell image.

The cell image 10 is described with reference to FIG. 2. Each cell image 10 includes cultivated cells 90. In this embodiment, the cell image 10 is a microscopic image captured by a microscope 8 to which an imaging apparatus attached. Each cell image 10 includes cells 90 that be able to differentiate (cell potency) as the cultivated cells 90. For example, the cells 90 include IPS cells (Induced Pluripotent Stem cells) and ES cells (Embryonic Stem cells). Undifferentiated cells refer to cells that have cell potency. Deviated cells refer to cells that are already differentiated cell and do not have cell potency. In this embodiment, an undifferentiated cell is referred to as a normal cell. Also, a deviated cell is referred to as an abnormal cell.

(Cultivated Cells Cultivated in Cultivation Container)

The cultivated cells 90 cultivated in the cultivation container 80 is now described with reference to FIG. 3.

Figure 3:
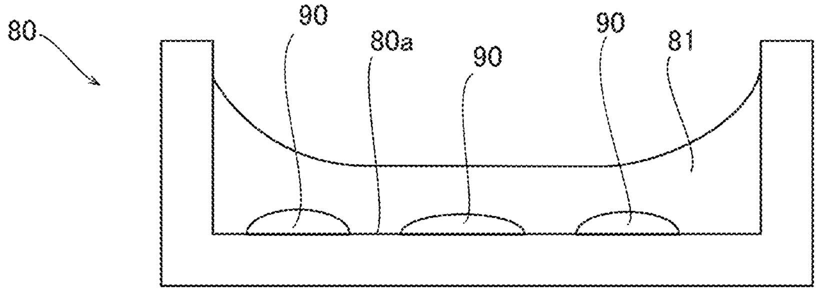
FIG. 3 is a schematic diagram illustrating cells cultivated in a cultivation container.

As shown in FIG. 3, the cells 90 are cultivated cells cultivated in the cultivation container 80 filled with the cultivation solution 81. In this embodiment, the cell image 10 includes cultivated cells 90 cultivated in the cultivation container 80. A coating material for culturing the cells 90 is applied onto a bottom 80*a* of the cultivation container 80. The coating material includes proteins required for the cells 90 to settle in the cultivation container 80.

(Image Analysis Method)

A method for analyzing the cell images 10 by using the cell image analysis method according to this embodiment is now described with reference to FIG. 4. A configuration in which the cells 90 included in the cell image 10 are classified into one of two or more types by analyzing the cell image 10 by using the cell image analysis apparatus 100 (see FIG. 1) in this embodiment. In this embodiment, the cell image analysis apparatus 100 analyzes the cell image 10 by using the learned model 6 (see FIG. 1) to determine into which type the cells 90 included in the cell image 10 is classified from the two or more types. The learned model 6 is configured to input the probability value 21 for every pixel of the cell image 10 when receiving the cell image 10. The probability value 21 is an estimation value of the classification.

Figure 4:
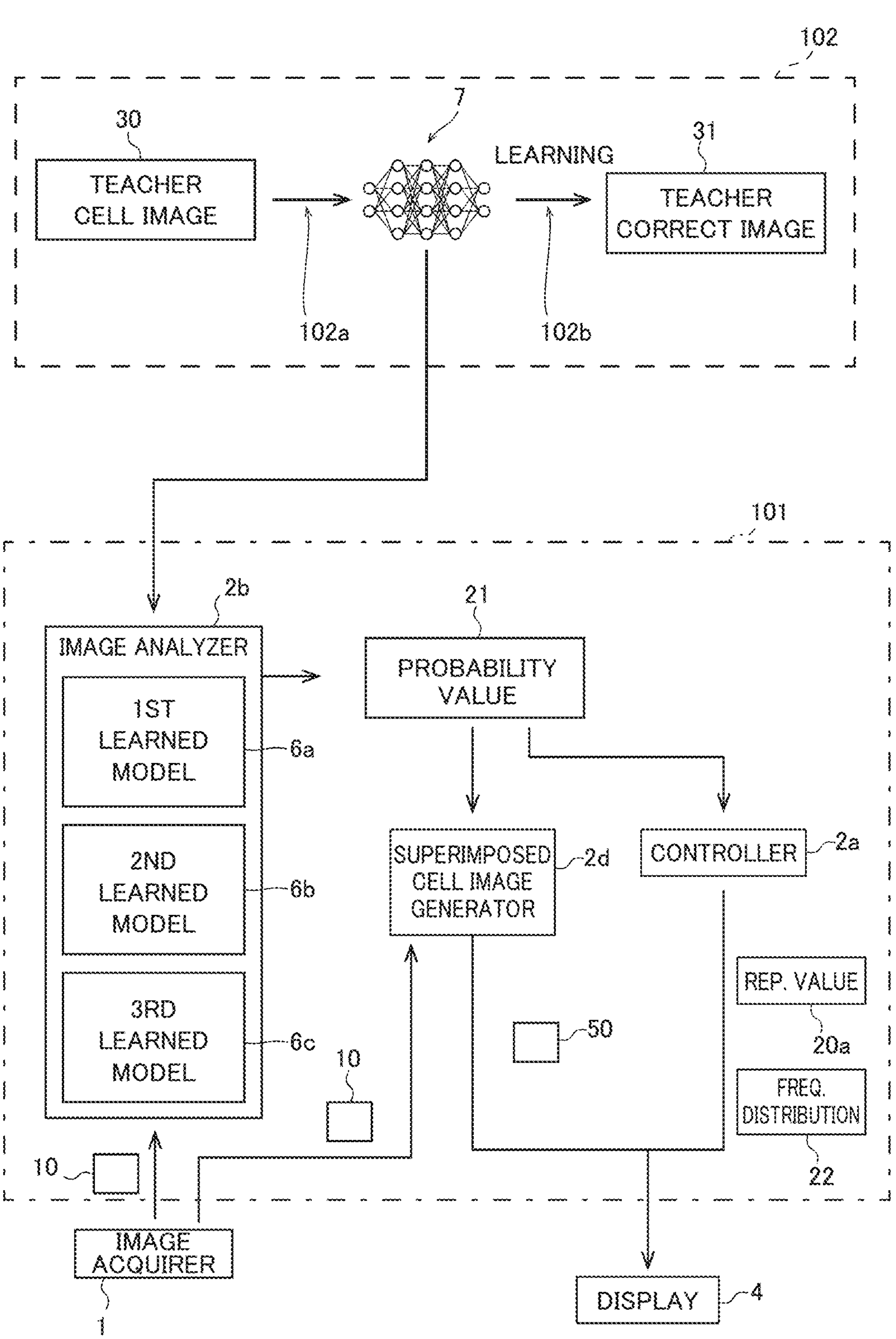
FIG. 4 is a schematic diagram illustrating a leaning method for learning a learning model, and a method for analyzing a cell image by using the learned model according to the embodiment.

FIG. 4 is a block diagram showing a flow of image processing in this embodiment. As shown in FIG. 4, in this embodiment, the cell image analysis method roughly includes an image analysis method 101, and a production method 102 of the learned model 6 (see FIG. 1).

(Generation of Learning Model)

In the production method 102 of the learned model 6 in this embodiment, the learned model 6 is produced by learning a learning model 7 by using the cell images 10. Specifically, the learned model 6 is produced by learning to output the probability value 21 for every pixel of the cell image 10 as an analysis result. As shown in FIG. 4, the production method 102 of the learned model 6 includes a step 102*a* of inputting teacher cell images 30 into the learning model 7, and a step 102*b* of learning the learning model 7 to output teacher correct images 31. The learned model 6 is a convolutional neural network (CNN) shown in FIG. 4 or a learning model partially including a convolutional neural network. The learned model 6 produced by learning the learning model 7 is stored in the storage 3 (FIG. 1) of the cell image analysis apparatus 100.

In this embodiment, the learned model 6 is produced by leaning at least one of classification of the cell whether a focus of the cell image 10 is correct when the cell image is captured, classification of the cell whether a coating material on the cultivation container 80 of the cell is proper, and classification of the cell whether the number of cultivation days of the cell is proper. In the production method 102 of the learned model 6, the learned model 6 is produced by using the teacher cell images 30 that are the cell image 10, and teacher correct images 31 that are generated adding the cell image 10 with a label value relating to at least two imaging conditions corresponding to the classification or a label value relating to at least two cultivation conditions corresponding to the classification.

In this embodiment, the learned model 6 includes the first learned model 6*a*, the second learned model 6*b* and the third learned model 6*c*. The first learned model 6*a* is a learned model that has learned classify the cells 90 included in the cell image 10 into one of the images captured under two or more imaging conditions based on the cell image 10. In other words, the teacher cell images 30 used to produce the first learned model 6*a* are cell images 10 that are captured under different imaging conditions.

Also, teacher correct images 31 are images that are added with different label values for pixels depending on the difference between the imaging conditions. Specifically, the teacher correct images 31 are images added with label values relating to two or more types of imaging conditions for pixels. The imaging conditions are a condition in which a focus of the cell image 10 (teacher and cell image 30) is correct, and a condition in which the focus is incorrect. Correspondingly, the teacher correct image 31 is an image that is added with a label value corresponding to the condition in which a focus of the cell image 10 is correct when the cell image is captured for every pixel, or an image that is added with a label value corresponding to the condition in which the focus is incorrect for every pixel. In other words, the teacher correct images 31 includes images classified into two classes, which are a correct focus class and an incorrect focus class. As a result, the first learned model 6*a* can be produced by learning the learning model 7 to classify each pixel of the input image into one of two or more types relating to the imaging conditions.

The second learned model 6*b* and the third learned model 6*c* are learned models that have learned classify the cells 90 included in the cell image 10 into one of the images including cell 90 cultivated under two or more types of cultivation conditions based on the cell image 10. Specifically, the second learned model 6*b* and the third learned model 6*c* are produced by using the cell images 10 including the cells cultivated under different cultivation conditions the teacher cell images 30. Also, images that are added with different label values for pixels depending on the difference between the cultivation conditions are used as the teacher correct images 31. Specifically, the teacher correct images 31 are images added with label values relating to two or more types of cultivation conditions for pixels. The cultivation conditions include conditions relating to different coating materials on the cultivation container 80 (see FIG. 3) in which the cells 90 are cultivated, and conditions relating to different numbers of cultivation days of the cells 90.

In other words, the second learned model 6*b* is produced by using the teacher correct images 31 added with at least two types of label values relating to the coating materials on the cultivation container 80 in which the cells 90 are cultivated. Specifically, the second learned model 6*b* is produced by using the teacher correct images 31 that are added with a label value indicating a coating material A used as the coating material on the cultivation container 80 in which the cells 90 are cultivated, and the teacher correct images 31 that are added with a label value indicating a coating material different from the coating material A. That is, the teacher correct images 31 includes images classified into two classes, which are a class of the coating material A and a class of the coating material B.

Also, the third learned model 6*c* is produced by using the teacher correct images 31 added with at least two types of label values relating to the numbers of cultivation days of the cells 90. Specifically, the third learned model 6*c* is produced by using the teacher correct images 31 that are added with a label value indicating a predetermined number of days as the number of cultivation days of the cells 90, and a label value indicating one other number of days different from the predetermined number of days as the number of cultivation days of the cells 90. In this embodiment, the predetermined number of days is 5, for example. That is, the teacher correct images 31 includes images classified into two classes, which are a class of 5 cultivation days and a class of cultivation days other than 5 days.

In this embodiment, the learned model 6 is produced by learning classification of cell images into two or more types of classification relating to imaging conditions or cultivation conditions to learn classification of the cell images whether the cell 90 is suitable for analysis whether the cell is a normal or abnormal cell. In this embodiment, the learned model 6 is produced by learning classification of the cell whether cells 90 of a common type are suitable for analysis whether each cell is a normal or abnormal cell.

(Image Analysis Method)

In this embodiment, the image analysis method 101 classifies the cells 90 included in the cell image 10 acquired by the image acquirer 1 from the microscope 8 (see FIG. 1), etc., into one of two or more types. The cell image analysis method 101 according to this embodiment includes a step of acquiring a cell image 10 of cells 90 (see FIG. 2); a step of inputting the cell image 10 to a learned model 6; a step of acquiring an index value 20 indicating accuracy of the classification of the cells 90 that is included in the cell image 10 into one of two or more types based on an analysis result of each of pixels of the cell image 10 output from the learned model 6; and a step of displaying the acquired index value 20. The steps in the image analysis method 101 will be described in detail later.

In this embodiment, the step of acquiring the cell image 10 is executed by the image acquirer 1. The image acquirer 1 is configured to acquire the cell images 10 from the imaging device such as the microscope 8 (see FIG. 1). Also, the image acquirer 1 is configured to output the acquired cell image 10 to the image analyzer 2*b*. In addition, the image acquirer 1 is configured to output the acquired cell image 10 to the superimposed cell image generator 2*d*.

In this embodiment, the step of analyzing the cell image 10 is executed by the image analyzer 2*b*. The image analyzer 2*b* is configured to input the cell image 10 to the learned model 6 whereby obtaining the index value 20. Specifically, the image analyzer 2*b* is configured to input the cell image 10 to any of the first learned model 6*a*, the second learned model 6*b*, an the third learned model 6*c* whereby obtaining the index value 20. The controller 2*a* is configured to determine which of the first learned model 6*a*, the second learned model 6*b*, and the third learned model 6*c* is used for analysis by the image analyzer 2*b*. The image analyzer 2*b* is configured to output the acquired index value 20 to the controller 2*a* and the superimposed cell image generator 2*d*. Specifically, the image analyzer 2*b* is configured to output the probability values 21 as the index value 20 to the controller 2*a* and the superimposed cell image generator 2*d*.

The controller 2*a* is configured to determine which of the first learned model 6*a*, the second learned model 6*b*, and the third learned model 6*c* is used for analysis in accordance with an operating input from a user. Specifically, the controller 2*a* is configured to determine which of the first learned model 6*a*, the second learned model 6*b*, and the third learned model 6*c* is used for analysis in accordance with an operating input that select which condition is used to analyze the cell image 10.

The controller 2*a* is configured to acquire a representative value 20*a* of the probability values 21 based on the probability values 21. In this embodiment, the controller 2*a* is configured to output one cell image with one representative value 20*a* based on the probability values 21 acquired for pixels of the cell image 10. In this embodiment, the controller 2*a* is configured to acquire an average value of probability values 21 as the representative value 20*a*.

Also, the controller 2*a* is configured to acquire a frequency distribution 22 of probability values 21 based on the probability values 21. In addition, the controller 2*a* is configured to display the acquired representative value 20*a* and the acquired frequency distribution 22 on the display 4. A configuration in which the representative value 20*a* and the frequency distribution 22 are acquired by the controller 2*a* will be described in detail later.

The superimposed cell image generator 2*d* is configured to generate the superimposed cell image 50 based on the cell image 10 and the index value 20. Also, the superimposed cell image generator 2*d* is configured to display the generated superimposed cell image 50 on the display 4.

(Difference Between Cell Images Captured Under Different Imaging Conditions)

Difference between cell images 10 captured under different imaging conditions is now described with reference to FIG. 5. In this embodiment, difference between the imaging conditions is that a focus of the cell image 10 is correct or in correct when the cell image is captured. A common part of the cultivation container 80 (see FIG. 3) is captured at different focus points as cell images 10*a* to 10*c* shown in FIGS. 5(A) to 5(C).

Figure 5A:
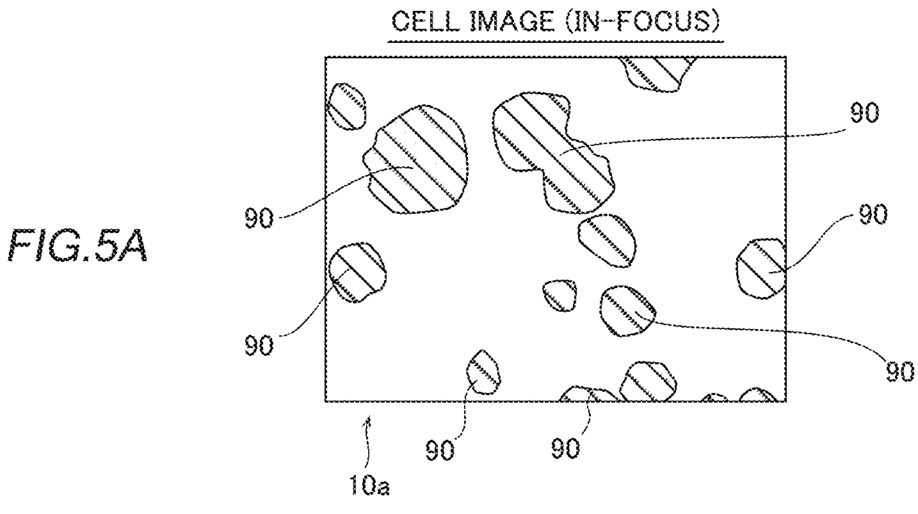
FIGS. 5(A) to 5(C) are schematic views illustrating different cell images, which are captured as a common image under different imaging conditions.

The cell image 10*a* shown in FIG. 5(A) is a cell image 10 captured at a correct focus point. In other words, the cell image 10*a* includes high contrast images of the cells 90. That is, outlines of the images of the cells 90 are clear in the cell image 10*a*. Here, the term a focus of an cell image is correct does not means that all cells in the cell image 10 are in focus but means that a central part of the cell image 10 is in focus. In other words, focus degrees of the cells 90 in the cell image 10*a* are not constant but a deviation of a focus degree of one cell 90 from the correct focus increases as a distance between the cell and the center of the image. That is, some cells 90 may be out of focus in the cell image 10*a*.

Figure 5B:
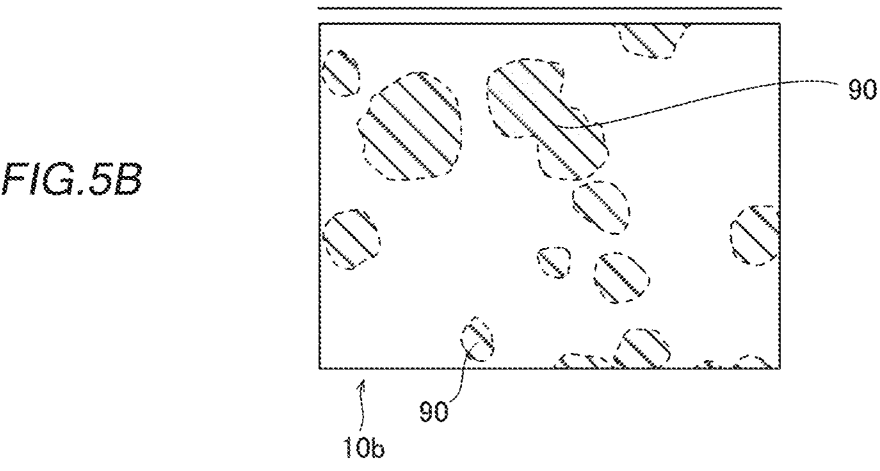

The cell image 10*b* shown in FIG. 5(B) is a cell image 10 captured at an incorrect focus point. In other words, the cell image 10*b* shown in FIG. 5(B) includes low contrast images of the cells 90. That is, outlines of the images of the cells 90 are unclear in the cell image 10*b*. A deviation of a focus degree of the cell image 10*b* from the correct focus (out-of-focus degree) is smaller than the cell image 10*c* shown in FIG. 5(C). Here, an indication "focus deviation −1" shown in FIG. 5(B) means that the deviation of a focus degree of the cell image 10*b* from the correct focus is smaller than the cell image 10*c* shown in FIG. 5(C). In the cell image 10*b* in FIG. 5(B), dashed lines indicating the outlines of the cells 90 represent the focus deviation from the correct focus. Also, focus degrees of the cells 90 in the cell image 10*b* shown in FIG. 5(B) are not constant but a deviation of a focus degree of one cell from the correct focus increases as a distance between the cell and the center of the image.

Figure 5C:
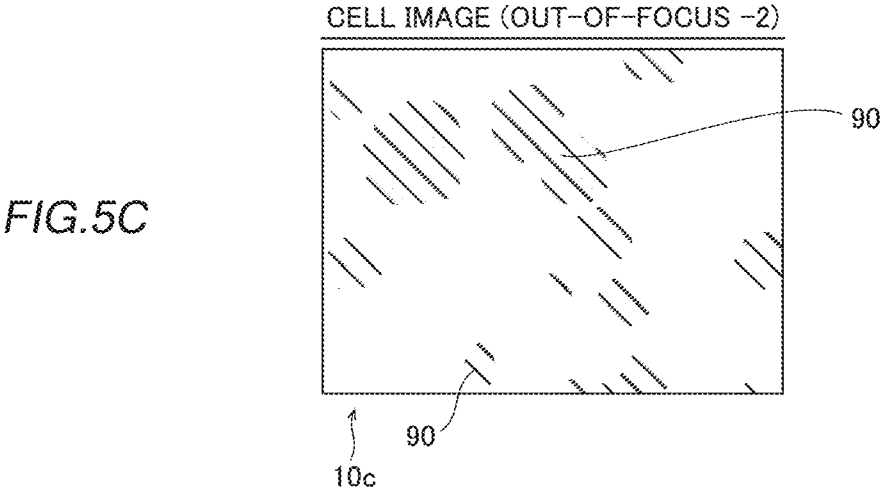

The cell image 10*c* shown in FIG. 5(C) is a cell image 10 captured at an incorrect focus point. In other words, the cell image 10*c* shown in FIG. 5(C) includes low contrast images of the cells 90. That is, outlines of the images of the cells 90 are unclear in the cell image 10*c*. A deviation of a focus degree of the cell image 10*c* from the correct focus (out-of-focus degree) is larger than the cell image 10*b*. That is, outlines of the images of the cells 90 are unclear in the cell image 10*c*. Here, an indication "focus deviation −2" shown in FIG. 5(C) means that the deviation of a focus degree of the cell image 10*c* from the correct focus is larger than the cell image 10*b* shown in FIG. 5(B). In the cell image 10*c* in FIG. 5(C), no outline of the cells 90 is shown to represent that the deviation of a focus degree of the cell image 10*c* from the correct focus is larger than the cell image 10*b*. Also, focus degrees of the cells 90 in the cell image 10*b* shown in FIG. 5(B) are not constant but a deviation of a focus degree of one cell from the correct focus increases as a distance between the cell and the center of the image.

(Probability Distribution Image)

In this embodiment, the image analyzer 2*b* is configured to classify cells 90 included in each of the cell images 10*a* to 10*c* into one of two or more types by using the first learned model 6*a*.

Specifically, the image analyzer 2*b* is configured to input the cell images 10*a* to 10*c* to the first learned model 6*a* whereby generating the probability distribution images 12 based on the probability values 21 output the probability from the first learned model 6*a*.

Figure 6:
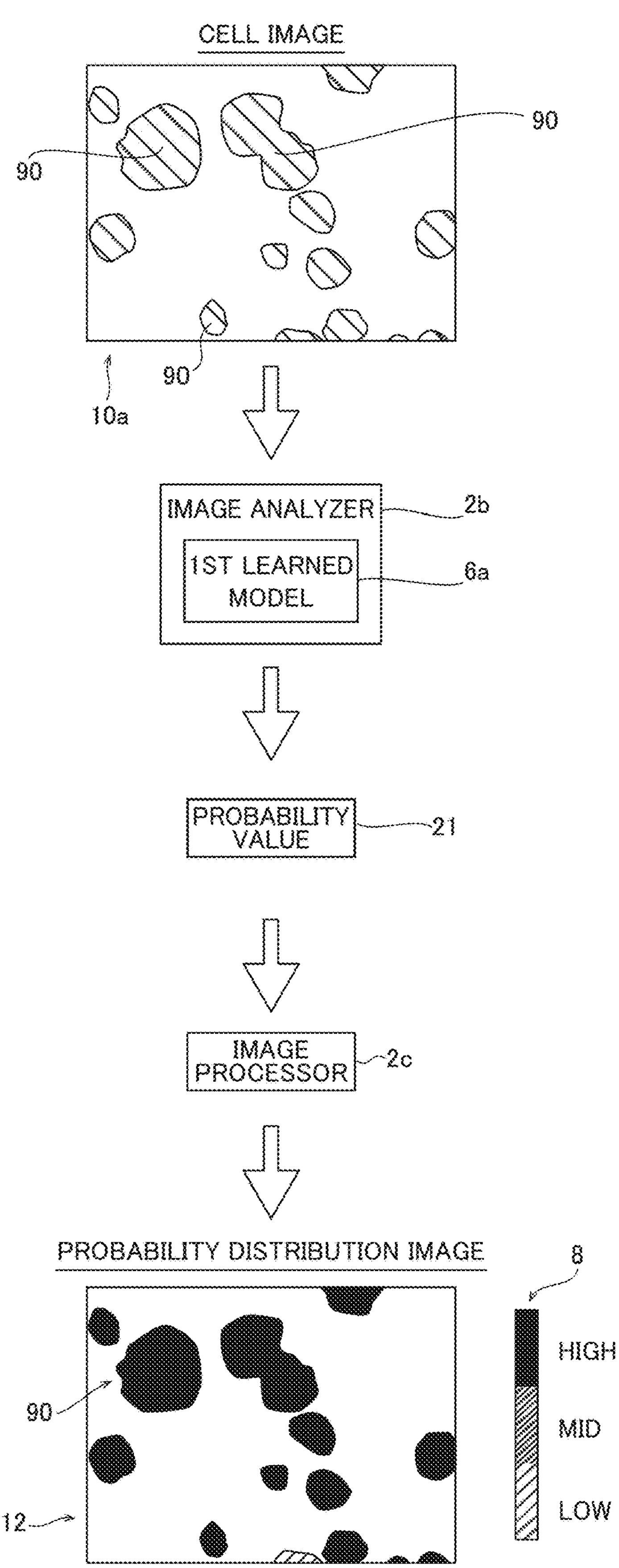
FIG. 6 is a schematic diagram illustrating a configuration in which a probability distribution image is generated by an image processor according to the embodiment.

In an exemplary case shown in FIG. 6, the image analyzer 2*b* inputs the cell image 10*a* in focus to the first learned model 6*a* whereby acquiring the probability values 21. In other words, in the exemplary case shown in FIG. 6, the image analyzer 2*b* acquires the probability value 21 for every pixel of the cell image 10*a*. The image analyzer 2*b* is configured to output the probability the acquired probability values 21 to the image processor 2*c*. In the exemplary case shown in FIG. 6, the image analyzer 2*b* acquires index values corresponding to a class that represents correct focus for pixels of the cell image 10 as the probability values 21.

As shown in FIG. 6, the image processor 2*c* is configured to generate the probability distribution image 12 representing a distribution of the probability values 21. The probability values 21 that are estimation values of the classification are distributed as pixel values in the probability distribution image 12. The probability distribution image 12 shown in FIG. 6 representing the distribution of the probability values 21 that are estimation values corresponding to a class that represents correct focus for pixels of the cell image 10. In the exemplary case shown in FIG. 6, different probability values 21 are represented by difference hatching patterns. The probability values 21 decrease in order of a black hatching pattern, a dark hatching pattern, and a light hatching pattern as shown in legends 8. In addition, as shown in the legends 8, the probability value 21 of each pixel is not indicated by an area of one hatching pattern but a certain area corresponding to a common probability value 21 is indicated by an area of one hatching pattern.

Although not shown in FIG. 6, the image analyzer 2*b* also inputs the cell image 10 to the first learned model 6*a* whereby acquiring the probability distribution image 12 that represents the distribution of the probability values 21 that are estimation values corresponding to a class that represents incorrect focus for pixels of the cell image.

The image processor 2*c* similarly acquires the probability distribution image 12 corresponding to a class that represents correct focus, and the probability distribution image 12 corresponding to a class that represents incorrect focus for the out-of-focus cell image 10*b* (see FIG. 5) and the out-of-focus cell image 10*c* (see FIG. 5).

(Superimposed Cell Image and Difference Between Superimposed Cell Images Due to Different Imaging Conditions)

Superimposed cell image 50 (see FIG. 1) and differences between superimposed cell images 50 due to different imaging conditions are now described with reference to FIG. 7. The superimposed cell image generator 2*d* is configured to generate the superimposed cell image 50 based on the cell image 10 and the probability distribution image 12. Specifically, the superimposed cell image generator 2*d* is configured to generate the superimposed cell image 50 by using the cell image 10 and the probability distribution images 12 that are acquired for at least two different label values.

Specifically, the superimposed cell image generator 2*d* is configured to generate the superimposed cell image 50 by superimposing marks that allow users to distinguish difference between different probability values 21 on the cell image 10 based on the probability distribution images 12. In this embodiment, the superimposed cell image generator 2*d* is configured to superimpose the marks that allow users to distinguish between the probability values 21 of label values corresponding to two or more classification types. Specifically, the superimposed cell image generator 2*d* is configured to superimpose the marks that allow users to distinguish between the probability values 21 of label values corresponding to two or more types of imaging conditions. More specifically, the superimposed cell image generator 2*d* is configured to superimpose the marks that allow users to distinguish between the probability value 21 of the label value corresponding to correct focus and the probability value 21 of the label value corresponding to in correct focus on the cell image 10. For example, the superimposed cell image generator 2*d* superimposes a blue mark 51 for the probability value 21 of the label value corresponding to correct focus. Also, the superimposed cell image generator 2*d* superimposes a red mark 52 for the probability value 21 of the label value corresponding to incorrect focus. In an exemplary case shown in FIG. 7, as shown in legends 9, the blue mark 51 is indicated by a tightest hatching pattern. Also, in the exemplary case shown in FIG. 7, as shown in legends 9, the red mark 52 is indicated by a loosest hatching pattern.

The superimposed cell image 50*a* shown in FIG. 7(A) is an image that is generated by superimposing a distribution of the probability values 21 that are acquired by inputting the cell image 10*a* to the first learned model 6*a* on the cell image 10*a* in focus (see FIG. 5(A)). Also, the superimposed cell image 50*b* shown in FIG. 7(B) is an image that is generated by superimposing a distribution of the probability values 21 that are acquired by inputting the cell image 10*b* to the first learned model 6*a* on the cell image 10*b* out of focus (see FIG. 5(B)). Also, the superimposed cell image 50*c* shown in FIG. 7(C) is an image that is generated by superimposing a distribution of the probability values 21 that are acquired by inputting the cell image 10*c* to the first learned model 6*a* on the cell image 10*c* out of focus (see FIG. 5(C)). In the exemplary case shown in FIG. 7, the blue mark 51 is superimposed on parts of the probability value 21 corresponding to correct focus. Also, the red mark 52 is superimposed on parts of the probability value 21 corresponding to incorrect focus. Accordingly, in the exemplary case shown in FIG. 7, in a mixed area in which the probability value 21 corresponding to correct focus and the probability value 21 corresponding to incorrect focus are included, a gradation mark 53 of blue and red is superimposed. In the exemplary case shown in FIG. 7, as shown in the legends 9, the gradation mark 53 of blue and red is indicated by a middle tight hatching pattern.

The superimposed cell image 50*a* in focus is largely occupied by parts on which the blue mark 51 indicating the probability value 21 corresponding to correct focus is superimposed. Also, the superimposed cell image 50*c* whose deviation of a focus degree from the correct focus is the largest is largely occupied by parts on which the red mark 52 indicating the probability value 21 corresponding to incorrect focus is superimposed. The parts on which the blue mark 51 is superimposed have the largest share of the superimposed cell image 50*b* whose deviation of a focus degree from the correct focus is smaller than the superimposed cell image 50*c*, and the parts on which the gradation mark 53 of blue and red is superimposed have the second largest share of the superimposed cell image 50*b*. The parts on which the red mark 52 is superimposed are also included in the superimposed cell image 50*b*.

(Representative Value and Difference Between Representative Values Due to Different Imaging Conditions)

Figure 8:
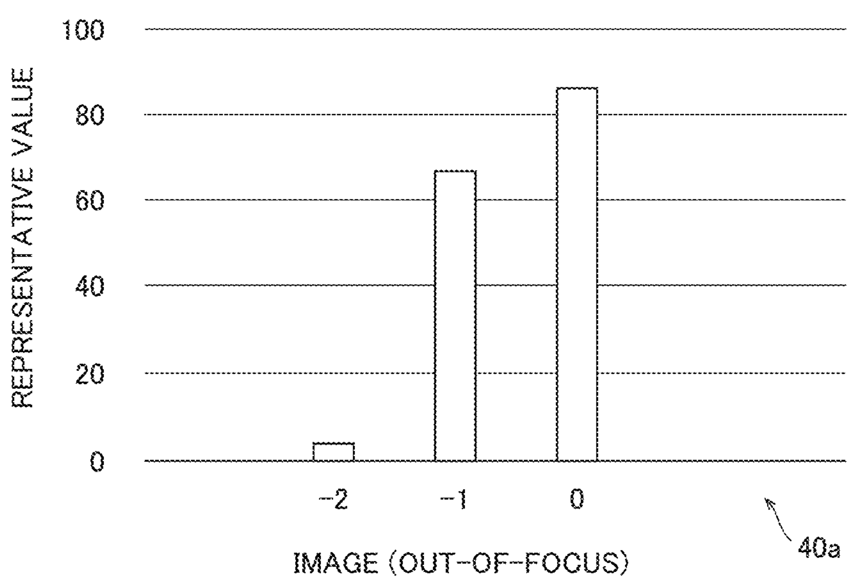
FIG. 8 is a schematic diagram illustrating difference in the numerical data of representative values of probability values caused by different focus points of cell images.

In this embodiment, the controller 2*a* is configured to acquire the representative values 20*a* of the probability values 21 as shown in FIG. 8. Specifically, the controller 2*a* is configured to acquire numerical data of the representative values 20*a* of the probability values 21. In other words, in this embodiment, the controller 2*a* is configured to acquire one representative value 20*a* from the probability values 21 acquired for every pixel of the cell image 10*a*. Also, in this embodiment, the controller 2*a* is configured to acquire the representative value 20*a* of the probability values 21 in cell areas as the representative value 20*a* of the probability values 21. The cell area is acquired by the image processor 2*c*. Specifically, the image processor 2*c* adds the probability distribution images 12 of at least two different label values to each other, and acquires an area of not smaller than a predetermined probability value 21 as the cell area in the probability distribution image 12 that is generated by the addition.

In this embodiment, the controller 2*a* acquires the representative value 20*a* based on the probability values 21 of the label value corresponding to one of two or more types of imaging conditions. Specifically, the controller 2*a* is configured to acquire the representative value 20*a* based on the probability values 21 of the label value corresponding to correct focus. That is, the controller 2*a* is configured to acquire the representative value 20*a* based on the probability values 21 of the label value suitable for analysis whether the cell is a normal or abnormal cell.

In this embodiment, the controller 2*a* is configured to acquire a graph that collectively indicates numerical data of a plurality of representative values 20*a* as shown in a graph 40*a*. In the graph 40*a*, its horizontal axis indicates deviations of a focus degree from the correct focus for each cell image 10, and its vertical axis indicates the representative value 20*a*. In other words, "0" on the horizontal axis indicates the cell image 10*a* in focus in the graph 40*a*. Also, "−1" on the horizontal axis indicates the cell image 10*b* out of focus in the graph 40*a*. Also, "−2" on the horizontal axis indicates the cell image 10*c* out of focus in the graph 40*a*. As shown in the graph 40*a*, the representative value 20*a* decreases as the deviation of a focus degree from the correct focus increases.

(Frequency Distribution and Difference Between Frequency Distributions Due to Different Imaging Conditions)

The frequency distribution 22 acquired by the controller 2*a* (see FIG. 4) and difference between the frequency distributions 22 due to different imaging conditions (see FIG. 4) are now described with reference to FIGS. 9 and 10.

Figure 9:
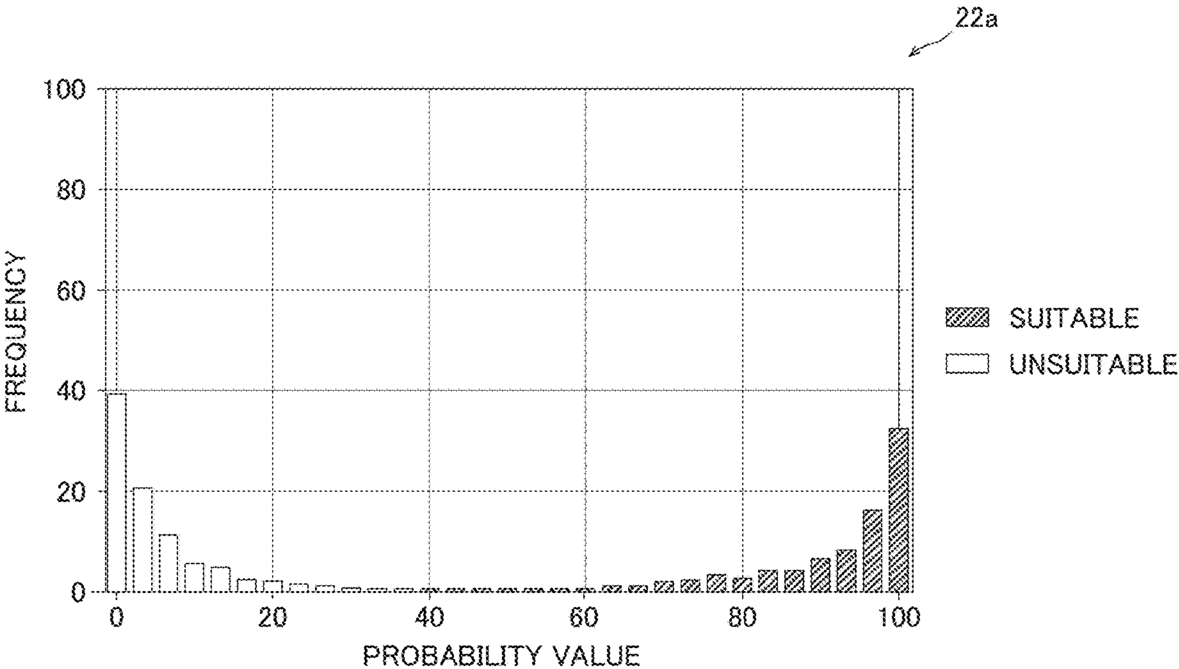
FIG. 9 is a schematic diagram illustrating a configuration in which a frequency distribution of probability values is displayed in a case in which a focus of the cell image is correct.

A frequency distribution 22*a* shown in FIG. 9 is a frequency distribution acquired based on the probability values 21 of the cell image 10*a* in focus. In the frequency distribution 22*a*, its horizontal axis indicates the probability value 21, and its vertical axis indicates a frequency. In other words, the frequency distribution 22*a* is a graph of the frequency of probability values 21 of pixels in the cell image 10*a* (see FIG. 5). In the frequency distribution 22*a*, the probability value 21 of a first type in two or more types of label values is hatched. In other words, in the frequency distribution 22*a*, the probability value 21 corresponding to a class that represents correct focus is hatched. In the frequency distribution 22*a*, the probability value 21 of a second type, which is different from the first type, in two or more types of label values is not hatched and indicated by a white bar. In other words, in the frequency distribution 22*a*, the probability value 21 corresponding to a class that represents incorrect focus is indicated by the white bar.

As shown in FIG. 9, because frequencies of pixels that correspond to high probability values 21 are high in the frequency distribution 22*a* of the cell image 10*a* in focus, a number of pixels are distributed in a right part of the frequency distribution 22*a*. Also, because frequencies of pixels that correspond to low probability values 21 are also high in the frequency distribution 22*a* of the cell image 10*a* in focus, a number of pixels are distributed also in a left part of the frequency distribution 22*a*.

Figure 10:
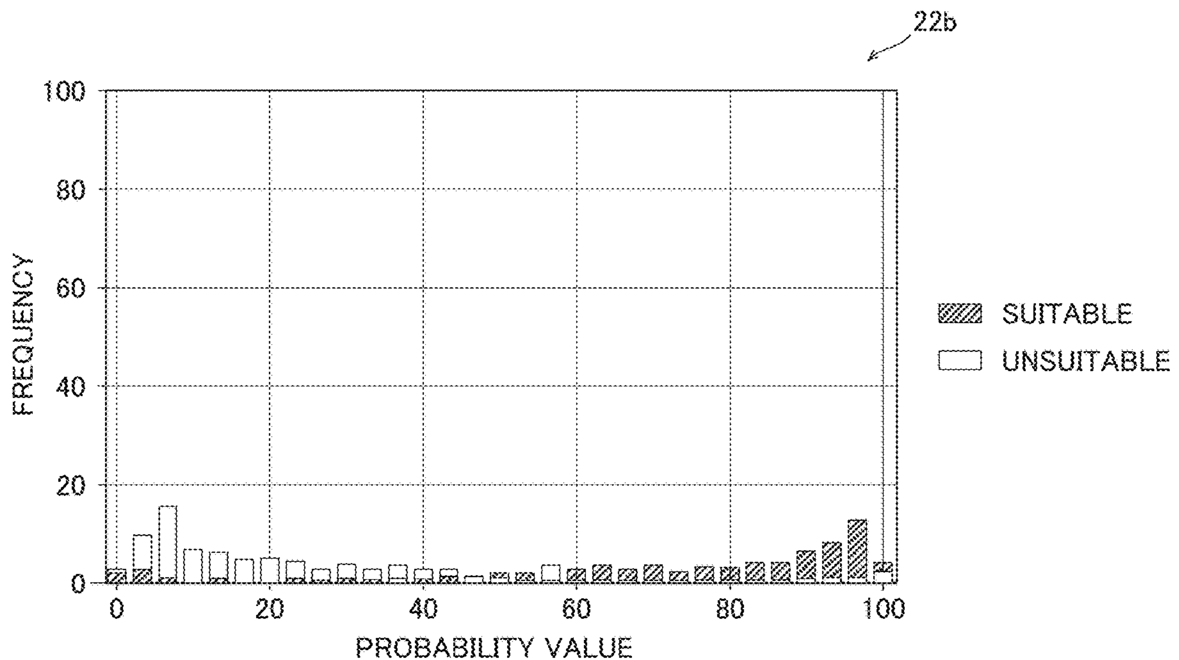
FIG. 10 is a schematic diagram illustrating a configuration in which a frequency distribution of probability values is displayed in a case in which a focus of the cell image is incorrect.

A frequency distribution 22*b* shown in FIG. 10 is a frequency distribution acquired based on the probability values 21 of the cell image 10*b* out of focus. In the frequency distribution 22*b*, its horizontal axis indicates the probability value 21, and its vertical axis indicates the frequency. In other words, the frequency distribution 22*b* is a graph of the frequency of probability values 21 of pixels in the cell image 10*b* (see FIG. 5). Also, in the frequency distribution 22*b*, the probability value 21 corresponding to a class that represents correct focus is hatched, while the probability value 21 corresponding to a class that represents incorrect focus is not hatched but indicated by the white bar.

As shown in FIG. 10, because frequencies of pixels that correspond to high probability values 21 are low in the frequency distribution 22*b* of the cell image 10*b* out of focus as compared to the frequency distribution 22*a* of the cell image 10*a* in focus (see FIG. 9), and frequencies of pixels that correspond to low probability values 21 corresponding to a class that represents correct focus are high, a distribution of pixels that correspond to high probability values 21 corresponding to a class that represents correct focus is not shifted toward the right side of the frequency distribution 22*a* but entirely spreads. Also, because frequencies of pixels that correspond to low probability values 21 corresponding to a class that represents incorrect focus are low, and frequencies of pixels that correspond to low probability values 21 corresponding to a class that represents incorrect focus are high in the frequency distribution 22*a* of the cell image 10*a* in focus, their distribution is not shifted toward the left side of the frequency distribution 22*a* but entirely spreads. In other words, it is possible to easily immediately classify the cell 90 included in the cell image 10 into one of two or more types of imaging conditions by seeing a shape of the frequency distribution 22.

(Display of Superimposed Cell Images, Representative Value, and Frequency Distribution)

Figure 11:
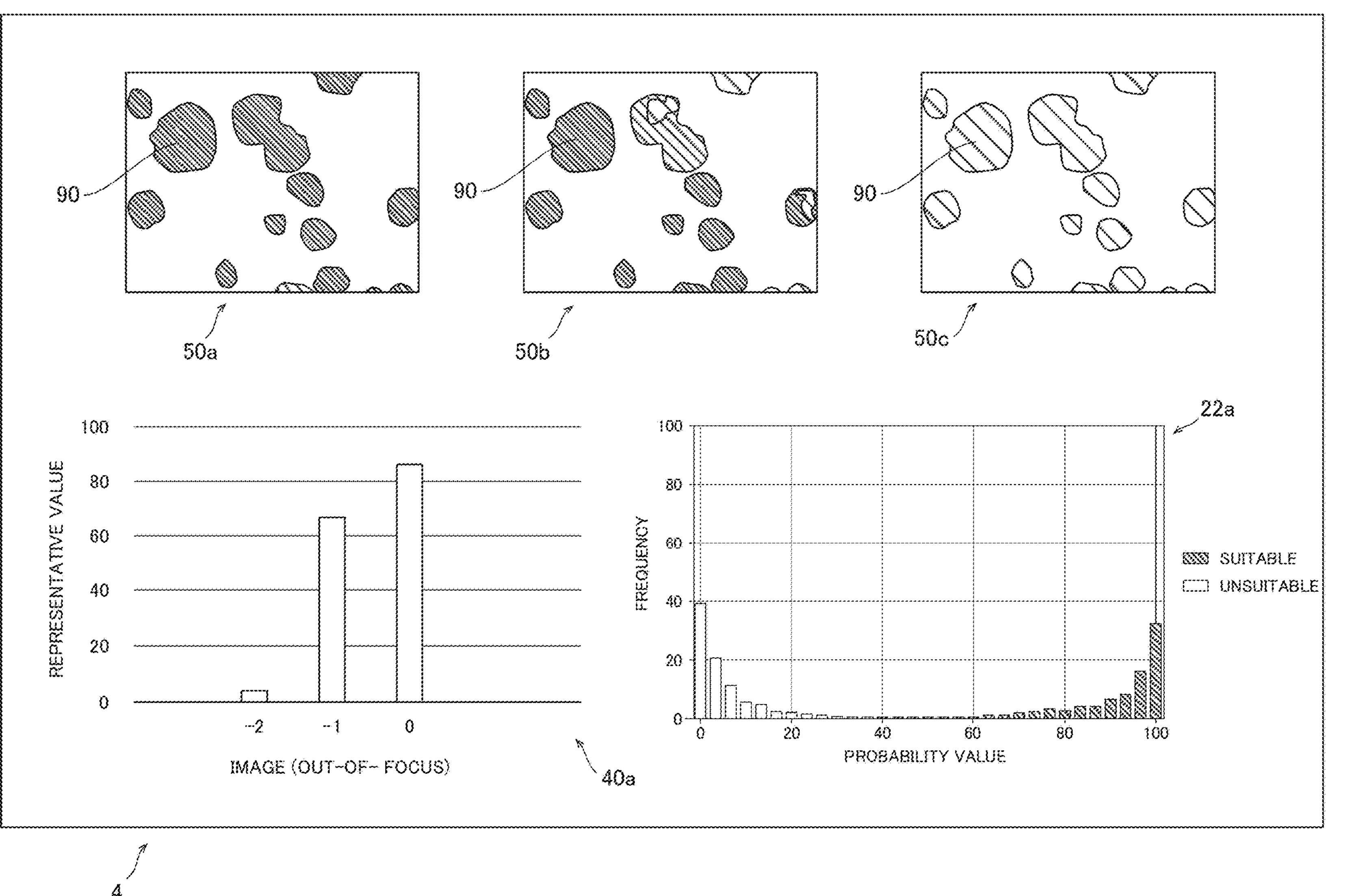
FIG. 11 is a schematic diagram illustrating a configuration in which superimposed cell images, representative values of probability values, and a frequency distribution are displayed by the cell image analysis apparatus according to the embodiment.

In this embodiment, the controller 2*a* (see FIG. 1) is configured to display numerical data of the representative value 20*a* (see FIG. 4) of the probability values 21 (see FIG. 4), and the superimposed cell image 50 that is generated by superimposing the distribution of probability values 21 on the cell image 10 on the display 4 as shown in FIG. 11. In this embodiment, the controller 2*a* (see FIG. 4) is configured to display the frequency distribution 22 on the display 4 of the probability values 21 together with numerical data of the representative value 20*a* of the probability values 21, and the superimposed cell image 50. In an exemplary case shown in FIG. 11, the controller 2*a* displays superimposed cell images 50*a* to 50*c* as the superimposed cell image 50. In the exemplary case shown in FIG. 11, the controller 2*a* displays a graph 40*a* as the numerical data of the representative value 20*a*. In the exemplary case shown in FIG. 11, the controller 2*a* displays a frequency distribution 22*a* as the frequency distribution 22.

(Difference Between Superimposed Cell Images Due to Different Coating Materials)

Difference between the superimposed cell images 50 (see FIG. 1) due to different coating materials is now described with reference to FIG. 12. A superimposed cell image 50*d* shown in FIG. 12(A) is generated based on the probability distribution image 12 that is generated based on the index values 20 acquired by analyzing the cell image 10 by using by the second learned model 6*b*, and the cell image 10. Specifically, the superimposed cell image 50*d* is an image generated based on the cell image 10 of cells 90 that are cultivated in the cultivation container 80 with a coating material A applied to a bottom 80*a* of the cultivation container 80. A configuration in which the superimposed cell image 50*d* is generated is similar to a configuration in which the superimposed cell images 50*a* to 50*c* are generated by first learned model 6*a*, except that the second learned model 6*b* is used instead of the first learned model 6*a*, and its description is omitted.

Also, a superimposed cell image 50*e* shown in FIG. 12(B) is generated based on the probability distribution image 12 that is generated based on the index values 20 acquired by analyzing the cell image 10 by using the second learned model 6*b*, and the cell image 10. Specifically, the superimposed cell image 50*e* is an image generated based on the cell image 10 of cells 90 that are cultivated in the cultivation container 80 with a coating material B applied to a bottom 80*a* of the cultivation container 80. In this embodiment, the second learned model 6*b* is produced by learning to output a probability that a coating material applied to the bottom 80*a* of the cultivation container 80 is the coating material A as the probability value 21. Accordingly, parts (tightest hatching part) on which the blue mark 51 is superimposed have a large share of the superimposed cell image 50*d* shown in FIG. 12(A). Also, parts (loosest hatching part) on which the red mark 52 is superimposed have a large share of the superimposed cell image 50*e* shown in FIG. 12(B).

(Difference Between Representative Values Due to Different Coating Materials)

The controller 2*a* is configured to acquire the representative value 20*a* for each cell image 10 based on the probability values 21 output by the second learned model 6*b*. In this embodiment, the controller 2*a* is configured to acquire a graph that collectively indicates a plurality of representative values 20*a* as shown in a graph 40*b* of FIG. 13. The graph 40*b* illustrates difference between the representative values 20*a* due to different coating materials. In the graph 40*b*, its horizontal axis indicates types of coating materials, and its vertical axis indicates the representative value 20*a*. A configuration in which the superimposed cell image 40*b* is generated by the controller 2*a* is similar to a configuration in which the graph 40*a* is generated, except that the probability values 21 output by the second learned model 6*b* is used instead of the probability values 21 output by the first learned model 6*a*, and its description is omitted.

It can be seen from the graph 40*b* that the representative value 20*a* of the cell image 10 of the cells 90 cultivated in the cultivation container 80 coated with the coating material A is greater than the representative value 20*a* of the cell image 10 of the cells 90 cultivated in the cultivation container 80 coated with the coating material B.

(Difference Between Superimposed Cell Images Due to Difference in Cultivation Days)

Difference between the superimposed cell images 50 due to difference in cultivation days is now described with reference to FIG. 14. A superimposed cell image 50*f* shown in FIG. 14(A) is an image generated based on the cell image 10 of cells 90 that are cultivated for 5 days as the cultivation days. Specifically, the superimposed cell image 50*f* is generated based on the probability distribution image 12 that is generated based on the index values 20 acquired by analyzing the cell image 10*a* by using the third learned model 6*c*, and the cell image 10. A configuration in which the superimposed cell image 50*f* is generated is similar to a configuration in which the superimposed cell images 50*a* to 50*c* are generated by first learned model 6*a*, except that the third learned model 6*c* is used instead of the first learned model 6*a*, and its description is omitted.

Also, a superimposed cell image 50*g* shown in FIG. 14(B) is an image generated based on the cell image 10 of cells 90 that are cultivated for 4 days as the cultivation days. Also, a superimposed cell image 50*h* shown in FIG. 14(C) is an image generated based on the cell image 10 of cells 90 that are cultivated for 6 days as the cultivation days. Also, a superimposed cell image 50*i* shown in FIG. 14(D) is an image generated based on the cell image 10 of cells 90 that are cultivated for 7 days as the cultivation days.

The third learned model 6*c* is produce by learning to output the probability values 21 relating to determination whether the cultivation days is 5. Accordingly, parts (tightest hatching part) on which the blue mark 51 is superimposed have a large share of the superimposed cell image 50*f* shown in FIG. 14(A). Also, parts (loosest hatching part) on which the red mark 52 is superimposed have a larger share of the superimposed cell image 50*g* shown in FIG. 14(B) as compared to the superimposed cell image 50*g* shown in FIG. 14(A). As shown in FIGS. 14(C) and 14(D), as the number of cultivation days increases, share of the superimposed cell image by the parts on which the red mark 52 is superimposed increases, and share of the superimposed cell image by the parts on which the gradation mark 53 of blue and red (middle tight hatching part) is superimposed increases.

(Difference Between Representative Values Due to Difference in Cultivation Days)

Figure 15:
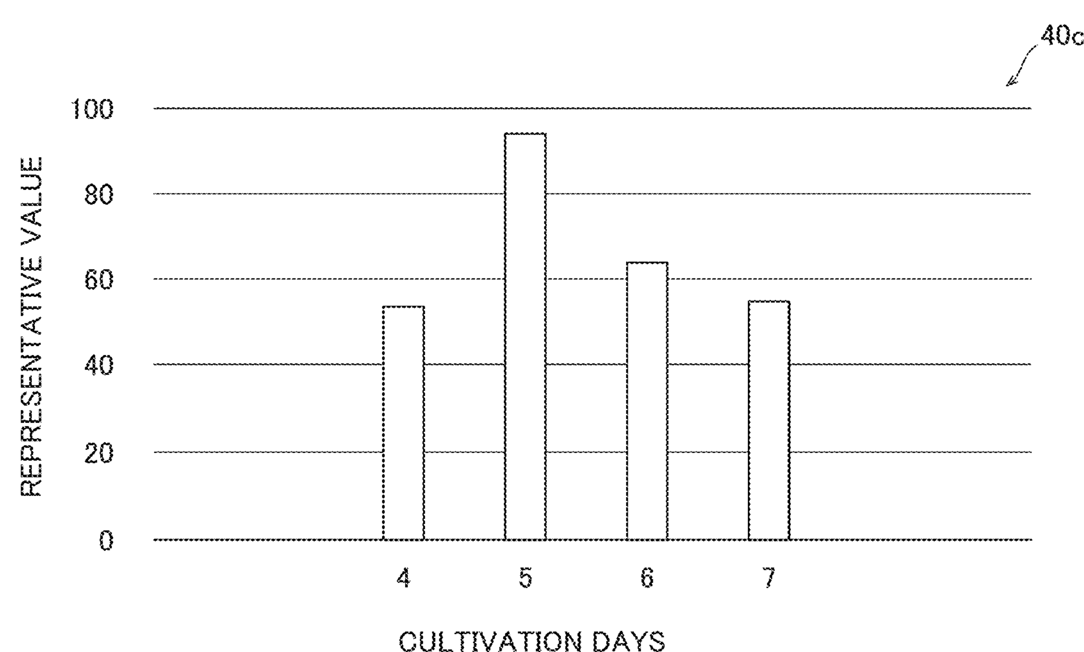
FIG. 15 is a schematic diagram illustrating difference in the numerical data of representative values of probability values caused by difference among the numbers of cultivation days of cells.

The controller 2*a* is configured to acquire the representative value 20*a* for each cell image 10 based on the probability values 21 output by third learned model 6*c*. In this embodiment, the controller 2*a* is configured to acquire a graph that collectively indicates a plurality of representative values 20*a* as shown in a graph 40*c* of FIG. 15. The graph 40*c* illustrates difference between the representative values 20*a* due to difference in cultivation days. In the graph 40*c*, its horizontal axis indicates cultivation days, and its vertical axis indicates the representative value 20*a*. A configuration in which the graph 40*c* is generated by the controller 2*a* is similar to a configuration in which the graph 40*a* is generated, except that the probability values 21 output by the third learned model 6*c* is used instead of the probability values 21 output by the first learned model 6*a*, and its description is omitted.

As shown in the graph 40*c*, the representative value 20*a* of the cell image 10 of cells 90 that are cultivated for 5 days is the highest. Also, it can be seen that the representative values 20*a* of the cell images 10 of cells 90 that are cultivated not for 5 days are smaller than the representative value 20*a* of the cell image 10 of cells 90 that are cultivated for 5 days. Also, in comparison between the representative value 20*a* of the cell image 10 of cells 90 that are cultivated for 4 days and the representative value 20*a* of the cell image 10 of cells 90 that are cultivated for 6 days, it can be seen that the representative value 20*a* of the cell image 10 of cells 90 that are cultivated for 6 days is higher.

(Threshold Processing of Representative Value)

In this embodiment, as shown in FIG. 11, a plurality of superimposed cell images 50, the numerical data (graph) of the representative values 20*a*, and the frequency distribution 22*a* are displayed on the display 4. Accordingly, a user can classify the cells 90 included in the cell image 10 into one of two or more types based on the plurality of superimposed cell images 50, the numerical data (graph) of the representative values 20*a* and the frequency distribution 22*a* displayed on the display 4. In other words, the user can determine whether the cells 90 included in the cell image 10 are suitable for analysis of determination whether they are normal or abnormal cells under two or more types of imaging conditions or two or more types of cultivation conditions. That is, the user can determine whether the cells 90 included in the cell image 10 are suitable for analysis of determination whether they are normal or abnormal cells. In this case, the user can specify a threshold for determination whether the cells 90 included in the cell image 10 are suitable for analysis of determination whether they are normal or abnormal cells based on the numerical data of the representative values 20*a*. In this embodiment, the controller 2*a* can determine whether the index value 20 is greater than the threshold. Specifically, the controller 2*a* determines whether the representative value 20*a* of the probability values 21 is greater than the threshold specified by the user whereby determining whether the cells 90 included in the cell image 10 are suitable for analysis of determination whether they are normal or abnormal cells. For example, the controller 2*a* determines that the cell image 10 is suitable for analysis of determination whether the cells 90 included in the cell image 10 are normal or abnormal cells if the representative value 20*a* is not smaller than 50%. Also, for example, the controller 2*a* determines that the cell image 10 is not suitable for analysis of determination whether the cells 90 included in the cell image 10 are normal or abnormal cells if the representative value 20*a* is smaller than 50%.

(Display of Superimposed Cell Image, Representative Value, and Frequency Distribution)

Figure 16:
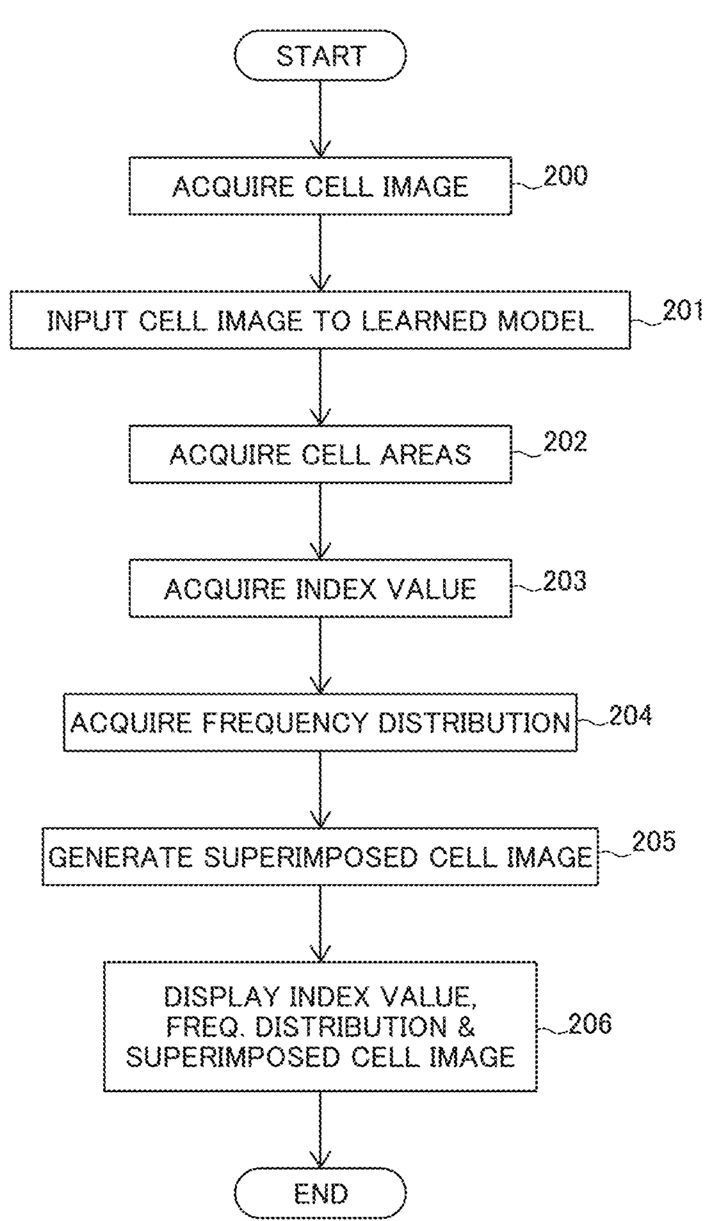
FIG. 16 is a flowchart illustrating display processing of representative values, a frequency distribution and superimposed cell images displayed by the cell image analysis apparatus according to the embodiment.

Processes of displaying the superimposed cell image 50, the representative value 20*a*, and the frequency distribution 22 in the cell image analysis apparatus 100 is now described with reference to FIG. 16.

In step 200, the image acquirer 1 acquires a cell image 10 including cells 90.

In step 201, the image analyzer 2*b* inputs the cell image 10 to the learned model 6, which has leaned to classify the cells 90 into one of two or more types.

In step 202, the image processor 2*c* acquires cell areas that are areas of the cells 90 included in the cell image 10. In this embodiment, the image processor 2*c* acquires the cell areas based on the probability distribution image 12 (see FIG. 6).

In step 203, the controller 2*a* acquire an index value 20 indicating accuracy of the classification of the cells 90 included in the cell image 10 into one of two or more types based on an analysis result of each of pixels of the cell image 10 output from the learned model 6. In this embodiment, in a process of step 203, the controller 2*a* acquired the representative value 20*a* of the probability values 21 obtained based on the probability values 21 output by the learned model 6 as the index value 20. Specifically, the controller 2*a* is configured to obtain the index values 20 of at least one of classification of the cell whether a focus of the cell image 10 is correct when the cell image is captured, classification of the cell whether a coating material on the cultivation container 80 of the cell is proper, and classification of the cell whether the number of cultivation days of the cell is proper is acquired. Also, in this embodiment, in the processing of step 203, the controller 2*a* acquires a value representing accuracy of suitability for analysis whether the cells 90 that are included in the cell image 10 are normal or abnormal cells based on the probability values 21 as the index value 20.

Also, in this embodiment, the controller 2*a* is configured to acquire the representative value 20*a* of the probability values 21 in the cell areas as the representative value 20*a* of the probability values 21 in a process of step 203. Specifically, the controller 2*a* acquires an average value of the probability values 21 as the representative value 20*a*.

In step 204, the controller 2*a* acquires the frequency distribution 22. Specifically, the controller 2*a* acquires the frequency distribution 22 based on the probability values 21 output from the learned model 6.

In step 205, the superimposed cell image generator 2*d* generates the superimposed cell image 50. Specifically, the superimposed cell image generator 2*d* generates the superimposed cell image 50 based on the cell image 10 and the probability distribution image 12 (see FIG. 6) acquired based on the probability values 21.

In step 206, the controller 2*a* displays the acquired index value 20. In this embodiment, in a processing of step 206, the controller 2*a* display numerical data of the representative value 20*a* of the probability values 21, and the superimposed cell image 50 that is generated by superimposing the distribution of probability values 21 on the cell image 10. In this embodiment, the controller 2*a* displays the frequency distribution 22 of the probability values 21 together with numerical data of the representative value 20*a* of the probability values 21, and the superimposed cell image 50. After that, the procedure ends.

Any one of the process in step 204 and the process in step 205 may be executed before another process.

(Generation of Learned Model)

Figure 17:
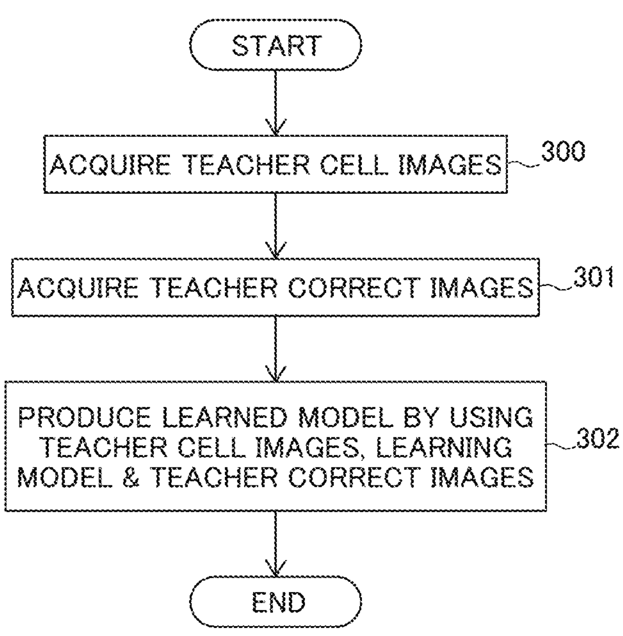
FIG. 17 is a flowchart illustrating production processing of a learned model produced by the cell image analysis apparatus according to the embodiment.

Processes of generating the learned model 6 is now described with reference to FIG. 17.

In step 300, the image acquirer 1 acquires a teacher cell image 30. The teacher cell image 30 is the cell image 10.

In step 301, the image acquirer 1 acquires a teacher correct image 31. The teacher correct image 31 is a label image that is the cell image 10 generated by adding the cell image with a label value relating to at least two imaging conditions corresponding to the classification or a label value relating to at least two cultivation conditions corresponding to the classification.

In this embodiment, when the first learned model 6*a* is generated, the cell image 10 that is added with a label value relating to at least two imaging conditions corresponding to the classification is acquired as the teacher correct image 31 in a process of step 301. Specifically, as the label value relating to the imaging conditions, the cell image 10 that is added with a label value corresponding to correct focus and label values corresponding to incorrect focus when the cell image 10 is captured for every pixel is acquired as the teacher correct image 31. The label values corresponding to incorrect focus include a plurality of label representing values representing degrees of out-of-focus degree. In this embodiment, the label values corresponding to incorrect focus include two label values.

Also, when the second learned model 6*b* is generated, the image acquirer 1 acquires the cell image 10 that is added with a label value relating to at least two cultivation conditions corresponding to the classification as the teacher correct image 31 in a process of step 301. Specifically, the image acquirer 1 acquires the cell image 10 that is added with at least two types of label values relating to the coating materials on the cultivation container 80 in which the cells 90 are cultivated as the teacher correct image 31. In this embodiment, the image acquirer 1 acquires the teacher correct images 31 that are added with two label values for pixels, which are a label value of the coating material A and the label value of the coating material B, as the label values relating to the coating materials.

Also, when the third learned model 6*c* is generated, the image acquirer 1 acquires the cell image 10 that is added with a label value relating to at least two cultivation conditions corresponding to the classification as the teacher correct image 31 in a process of step 301. Specifically, the image acquirer 1 acquires the cell image 10 that is added with at least two types of label values relating to the cultivation days of the cells 90 as the teacher correct image 31. In this embodiment, the image acquirer 1 acquires the teacher correct images 31 that are added with a label value of 5 cultivation days and a label value of cultivation days excluding 5 for pixels as the label values relating to the cultivation days.

In step 302, the image processor 2*c* produces the learned model 6 by using the teacher cell images 30 that are the cell image 10, and teacher correct images 31 that are generated by adding the cell image 10 with a label value relating to at least two imaging conditions corresponding to the classification or a label value relating to at least two cultivation conditions corresponding to the classification.

In this embodiment, in a process of step 302, the image processor 2*c* produces the learned model 6 by using the teacher correct images 31 that are added with two types of label values corresponding to whether a focus of the cell image 10 is correct when the cell image is captured as the label value relating to the imaging conditions, or at least two types of label values relating to coating materials on the cultivation container 80 in which the cells 90 are cultivated, and the number of cultivation days of the cell as the label value relating to the cultivation conditions. After that, the procedure ends.

(Classification of Cell Image)

Figure 18:
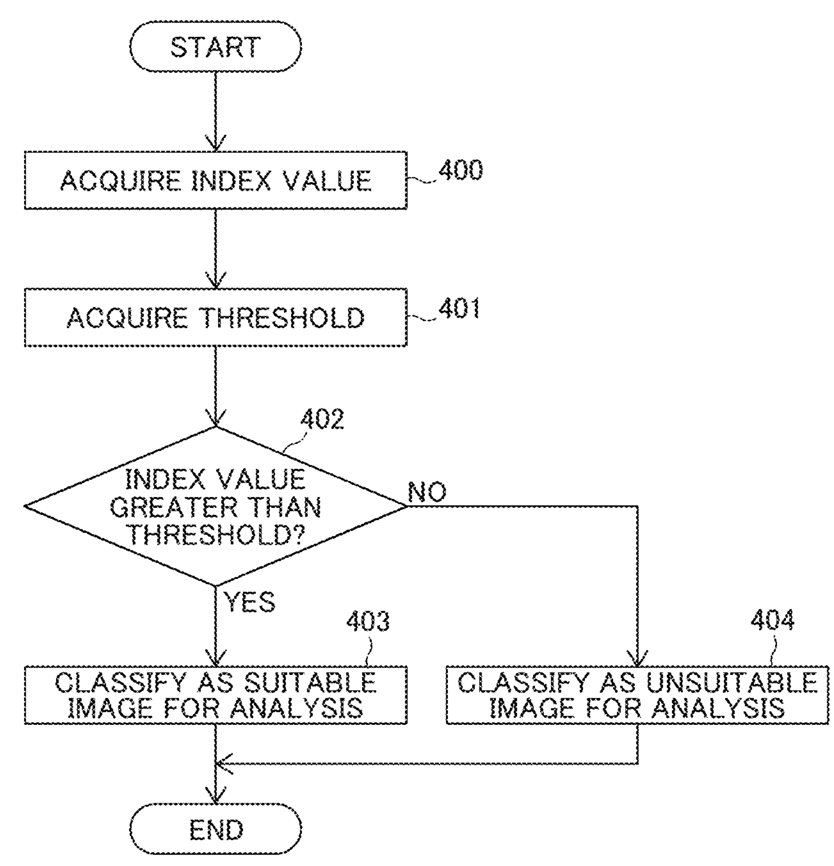
FIG. 18 is a flowchart illustrating classification processing of a cell image classified by the cell image analysis apparatus according to the embodiment.

Processes of classifying the cell image 10 in the cell image analysis apparatus 100 is now described with reference to FIG. 18.

In step 400, the controller 2*a* acquires the index value 20. In this embodiment, the controller 2*a* acquires the index value 20 acquired by the image analyzer 2*b* by using the cell image 10 and the learned model 6.

In step 401, the controller 2*a* acquires a threshold. Specifically, the controller 2*a* acquires a threshold that is previously specified by a user and stored in the storage 3.

In step 402, the controller 2*a* determines whether the index value 20 is greater than the threshold. In other words, the controller 2*a* determines whether the index value 20 is greater than the threshold for each cell image 10. If the index value 20 is greater than the threshold, the procedure goes to step 403. If the index value 20 is not greater than the threshold, the procedure goes to step 404.

In step 403, the controller 2*a* classifies the cell image 10 whether it is suitable for analysis whether the cells 90 are normal or abnormal cells. In addition, the controller 2*a* stores the cell image 10 that is classified into the image that is suitable for analysis whether the cells 90 are normal or abnormal cells in the storage 3. After that, the procedure ends.

If the procedure goes from step 402 to step 404, the controller 2*a* classifies the cell image 10 into the image that is not suitable for analysis whether the cells 90 are normal or abnormal cells in step 404. In this case, the controller 2*a* does not store the cell image 10 in the storage 3. After that, the procedure ends.

Advantages of the Embodiment

In this embodiment, the following effects can be acquired.

In this embodiment, as discussed above, a cell image analysis method includes a step of acquiring a cell image 10 including a cell 90; a step of inputting the cell image 10 to a learned model 6 that has learned classification of the cell 90 into one of two or more types; a step of acquiring an index value 20 indicating accuracy of the classification of the cell 90 that is included in the cell image 10 into one of two or more types based on an analysis result of each of pixels of the cell image 10 output from the learned model 6; and a step of displaying the acquired index value 20.

Consequently, because the index value 20 indicating accuracy of the classification of the cell 90 that is included in the cell image 10 into one of two or more types is displayed, users can easily grasp a probability of classification of the cell 90 in the cell image 10 by seeing the index value 20. Therefore, it is possible to provide a cell image analysis method capable of allowing users to easily grasp a probability of classification of the cell 90 in the cell image 10.

In addition, following additional advantages can be obtained by the aforementioned embodiment added with configurations discussed below.

That is, in this embodiment, as discussed above, the learned model 6 has been learned to output the probability values 21 that are estimation values of the classification as the analysis result; and a representative value 20*a* of the probability values 21 obtained based on the probability values 21 output by the learned model 6 is acquired as the index value 20 in the step of acquiring an index value 20. Consequently, dissimilar to a configuration in which probability values 21 for pixels of the cell image 10 are displayed, it is possible to easily grasp accuracy of classification of the cells 90 included in the cell image 10 based on the representative value 20*a* of the probability values 21 in each cell image 10.

In this embodiment, as discussed above, the cell image 10 includes cultivated cell 90 that is cultivated in a cultivation container 80; the learned model 6 is produced by leaning at least one of classification of the cell whether a focus of the cell image is correct when the cell image 10 is captured, classification of the cell whether a coating material on the cultivation container 80 of the cell is proper, and classification of the cell whether the number of cultivation days of the cell is proper; and index values 20 of at least one of classification of the cell whether a focus of the cell image is correct when the cell image 10 is captured, classification of the cell whether a coating material on the cultivation container 80 of the cell is proper, and classification of the cell whether the number of cultivation days of the cell is proper are acquired as the index value in the step of acquiring the index values 20. Consequently, users can easily grasp at least one of classification of the cell whether a focus of the cell image is correct when the cell image 10 is captured, classification of the cell whether a coating material on the cultivation container 80 of the cell is proper, and classification of the cell whether the number of cultivation days of the cell is proper are acquired as the index value by seeing the index values 20.

In this embodiment, as discussed above, the learned model 6 is produced by learning classification of the cell whether the cell 90 is suitable for analysis whether the cell is a normal or abnormal cell; and a value representing accuracy of suitability for analysis whether the cells 90 that are included in the cell image 10 are normal or abnormal cells based on the probability values 21 is acquired as the index value 20 in the step of acquiring the index values 20. Accordingly, because the index values 20 representing accuracy of suitability for analysis whether the cells 90 that are included in the cell image 10 are normal or abnormal cells are displayed, users can easily grasp whether the cells 90 included in the cell image 10 are suitable for analysis of determination whether they are normal or abnormal cells by seeing the index values 20. Consequently, it is possible to provide a cell image analysis method capable of allowing users to easily grasp whether the cells 90 included in the cell image 10 are suitable for analysis of determination whether they are normal or abnormal cells.

In this embodiment, as discussed above, the learned model 6 is produced by learning classification of the cell whether cells 90 of a common type are suitable for analysis whether each cell is a normal or abnormal cell. Consequently, based on analysis of the cell image 10 by using the learned model 6, it is possible to classify images including cells 90 of a common type whether it is suitable for analysis whether each cell is a normal or abnormal cell.

In this embodiment, as discussed above, a step of acquiring cell areas that are an area of the cell 90 included in the cell image 10 is further provided; and the representative value 20*a* of the probability values 21 in the cell areas as the representative value 20*a* of the probability values 21 is acquired in the step of obtaining the representative value 20*a* of the probability values 21. Accordingly, it is possible to prevent increase of a processing load as compared to a configuration in which the representative value 20*a* is acquired based on the probability values 21 of pixels of the entire cell image 10.

In this embodiment, as discussed above, numerical data of the representative value 20*a* of the probability values 21, and the superimposed cell image 50 that is generated by superimposing the distribution of probability values 21 on the cell image 10 are displayed in the step of displaying the representative value 20*a* of the probability values 21. Accordingly, because the representative value 20*a* of the probability values 21 is displayed, it is possible to easily grasp accuracy of classification of the cells 90 included in the cell image 10 based on the numerical data of the representative value 20*a* of the probability values 21 in each cell image 10. In addition, because superimposed cell image 50 is displayed, it is possible to grasp accuracy of classification of each cell 90 included in the cell image 10 based on the superimposed cell image 50.

In this embodiment, as discussed above, the frequency distribution 22 of the probability values 21 is displayed together with numerical data of the representative value 20*a* of the probability values 21, and the superimposed cell image 50 in the step of displaying the representative value 20*a* of the probability values 21. Consequently, it is possible to grasp accuracy of classification of the cells 90 included in the cell image 10 from different viewpoints by confirming the frequency distribution 22 together with numerical data of the representative value 20*a* of the probability values 21, and the superimposed cell image 50 in each cell image 10.

In this embodiment, as discussed above, an average value of the probability values 21 as the representative value 20*a* is acquired in the step of obtaining the representative value 20*a* of the probability values 21. For example, as compared to a configuration in which a median value in the probability values 21 is acquired as the representative value 20*a*, in a case in which the cell image 10 includes an area that is small but corresponds to very high accuracy (probability value 21) of a first type of classification of two or more types, the value of the first type of classification is acquired as the representative value 20*a*. In this case, even if the cells 90 included in the cell image 10 should be classified as a second type of classification different from the first type of classification from its entire view, the cells 90 included in the cell image 10 are classified into the first type of the two or more types based on the probability values 21 of a part of the cell image 10. To address this, the average value of the probability values 21 is acquired as the representative value 20*a* as discussed above whereby preventing that the cell image 10 is classified into the first type of the two or more types based on the probability values 21 of a part of the cell image 10 when the cell image 10 is classified by classifying the cells 90 included in the cell image 10. Consequently, it is possible to prevent reduction of classification accuracy when the cell image 10 is classified by classifying the cells 90 included in the cell image 10.

In this embodiment, as discussed above, a step of producing the learned model 6 by using the teacher cell images 30 that are the cell image 10, and teacher correct images 31 that are generated by adding the cell image 10 with a label value relating to at least two imaging conditions corresponding to the classification or a label value relating to at least two cultivation conditions corresponding to the classification is further included. Accordingly, the learned model 6 can be produced to be able to classify the cell image 10 into one of images in which the cells 90 included in the cell image 10 are captured under two or more types of imaging conditions by using the teacher correct images 31 that are generated by adding the cell image 10 with a label value relating to at least two imaging conditions corresponding to the classification. Also, the learned model 6 can be produced to be able to classify the cell image 10 into one of images including the cultivated cells 90 in which the cells 90 included in the cell image 10 are cultivated under two or more types of cultivation conditions by using the teacher correct images 31 that are generated by adding the cell image with a label value relating to at least two cultivation conditions corresponding to the classification.

In this embodiment, as discussed above, the learned model 6 is produced by using the teacher correct images 31 that are added with two types of label values corresponding to whether a focus of the cell image 10 is correct when the cell image is captured as the label value relating to the imaging conditions, or at least two types of label values relating to coating materials on a cultivation container 80 in which the cells 90 are cultivated, and the number of cultivation days of the cell as the label value relating to the cultivation conditions in the step of producing the learned model 6. Consequently, the learned model 6 can be produced to be used to classify an image into one of two or more types of classes relating to any of conditions whether a focus of the cell image is correct when the cell image 10 is captured, conditions whether a coating material on the cultivation container 80 of the cell is proper, and conditions whether the number of cultivation days of the cell is proper.

In this embodiment, as discussed above, a step of determining whether the index value 20 is greater than a threshold is further provided. Accordingly, the cell image 10 whose index value 20 is greater than the threshold can be determined as an image that is suitable for analysis of determination whether the cells 90 included in the cell image 10 are normal or abnormal cells if the Also, the cell image 10 whose index value 20 is not greater than the threshold can be determined as an image that is not suitable for analysis of determination whether the cells 90 included in the cell image 10 are normal or abnormal cells if the Accordingly, in a case in which a plurality of cell images 10 are used for analysis whether the cells 90 that are included in the cell image 10 are normal or abnormal cells, only the cell image 10 that is suitable for analysis of determination whether the cells 90 included in the cell image 10 are normal or abnormal cells can be used foe the analysis. Consequently, it is possible to prevent reduction of accuracy of analysis of determination whether the cells 90 included in the cell image 10 are normal or abnormal cells.

MODIFIED EMBODIMENTS

Note that the embodiment disclosed this time must be considered as illustrative in all points and not restrictive. The scope of the present invention is not shown by the above description of the embodiments but by the scope of claims for patent, and all modifications (modified embodiments) within the meaning and scope equivalent to the scope of claims for patent are further included.

While the example in which the controller 2*a* acquires an average value of the probability values 21 as the representative value 20*a* has been shown in the aforementioned embodiment, the present invention is not limited to this. For example, the controller 2*a* may acquire any of a median value, the maximum value, the minimum value, and the most frequently appearing value of the probability values 21 as the representative value 20*a*.

While the example in which the learned model 6 is produced by leaning at least one of classification of the cell whether a focus of the cell image is correct as imaging conditions, classification of the cell whether a coating material on the cultivation container 80 of the cell is proper, and classification of the cell whether the number of cultivation days of the cell 90 is proper has been shown in the aforementioned embodiment, the present invention is not limited to this. For example, the learned model 6 may be produced by learning classification of conditions other than classification whether a focus of the cell image is correct as imaging conditions. For example, the learned model 6 may be produced by learning classification whether a type of imaging device is proper as imaging conditions. Also, the learned model 6 may be produced by learning classification of conditions other than classification of the cell whether a coating material on the cultivation container 80 of the cell is proper, and classification of the cell whether the number of cultivation days of the cell is proper. For example, the learned model 6 may be produced by learning classification whether a type of cultivation device is proper as imaging conditions. Any imaging conditions and any cultivation conditions can be used for classification by the learned model 6.

While the example in which the controller 2*a* is configured to acquire the representative value 20*a* of the probability values 21 in cell areas has been shown in the aforementioned embodiment, the present invention is not limited to this. For example, the controller 2*a* may be configured to acquire the representative value 20*a* based on the probability values 21 of all pixels in the cell image 10. However, if the controller 2*a* is configured to acquire the representative value 20*a* of the probability values 21 of all pixels in the cell image 10, the processing load of acquiring the representative value 20*a* increases. For this reason, the controller 2*a* is preferably configured to acquire the representative value 20*a* of the probability values 21 in cell areas.

While the example in which the controller 2*a* is configured to display the superimposed cell image 50, numerical data of the representative value 20*a*, and the frequency distribution 22 on the display 4 has been shown in the aforementioned embodiment, the present invention is not limited to this. For example, the controller 2*a* may be configured to display only the numerical data of the representative value 20*a* on the display 4. Also, the controller 2*a* may be configured to display the numerical data of the representative value 20*a* and the superimposed cell image 50 on the display 4.

While the example in which the controller 2*a* displays numeric data of the representative value 20*a* on the display 4 by collectively displaying numeric data of a plurality of representative values 20*a* in the graph 40*a*, the graph 40*b*, or the graph 40*c* has been shown in the aforementioned embodiment, the present invention is not limited to this. For example, the controller 2*a* may be configured to display the numerical data of the representative values 20*a* by displaying Arabic figures of the representative values 20*a* instead of the graph.

While the example in which the cell image analysis apparatus 100 produces the learned model 6 has been shown in the aforementioned embodiment, the present invention is not limited to this. For example, the cell image analysis apparatus 100 may be configured to use the learned model 6 that is produced by an image analysis apparatus other than the cell image analysis apparatus 100.

While the example in which the superimposed cell image generator 2*d* generates the superimposed cell image 50 including the blue mark 51 that is superimposed on parts of the probability value 21 corresponding to correct focus a first type of classification of two or more types of classification, and the red mark 52 that is superimposed on parts of the probability value 21 corresponding to a second type of classification different from the first type of classification has been shown in the aforementioned embodiment, the present invention is not limited to this. The superimposed cell image generator 2*d* may superimpose any color marks on parts of the probability values 21 of label values corresponding to two or more types of classification as long as the probability values 21 can be distinguished from each other.

While the example in which the image processor 2*c* generates the first learned model 6*a* by using teacher correct images 31 that are added with two types of label values corresponding to classification whether a focus of the cell image is correct has been shown in the aforementioned embodiment, the present invention is not limited to this. For example, the image processor 2*c* may be configured to generate a learning model 7 by using teacher correct images that are added with three or more label values corresponding to in-focus degrees.

While the example in which the image processor 2*c* generates the second learned model 6*b* by using teacher correct images 31 that are added with two types of label values corresponding to classification whether a type of the coating material is the coating material A has been shown in the aforementioned embodiment, the present invention is not limited to this. For example, the image processor 2*c* may be configured to generate a learning model 7 by using teacher correct images that are added with three or more label values corresponding to types of coating materials.

While the example in which the image processor 2*c* generates the third learned model 6*c* by using teacher correct images 31 that are added with two types of label values corresponding to classification whether the number of cultivation days is 5 has been shown in the aforementioned embodiment, the present invention is not limited to this. For example, the image processor 2*c* may be configured to generate a learning model 7 by using teacher correct images that are added with three or more label values corresponding to cultivation days.

While the example in which the image acquirer 1 acquires the cell image 10 in step 201 has been shown in the aforementioned embodiment, the present invention is not limited to this. For example, the image processor 2*c* may be configured to acquire the cell image 10 that is previously acquired by the image acquirer 1 and stored in the storage 3.

While the example in which the controller 2*a* determines whether the index value 20 is greater than the threshold has been shown in the aforementioned embodiment, the present invention is not limited to this. For example, the controller 2*a* may not determine whether the index value 20 is greater than the threshold

MODES

The aforementioned exemplary embodiment will be understood as concrete examples of the following modes by those skilled in the art.

Mode Item 1

A cell image analysis method includes a step of acquiring a cell image(s) includes a cell(s); a step of inputting the cell image to a learned model that has learned classification of the cell into one of two or more types; a step of acquiring an index value indicating accuracy of the classification of the cell that is included in the cell image into one of two or more types based on an analysis result of each of pixels of the cell image output from the learned model; and a step of displaying the acquired index value.

Mode Item 2

In the cell image analysis method according to mode item 1, the learned model has been learned to output a probability value(s) that is/are an estimation value(s) of the classification as the analysis result; and a representative value of the probability value(s) obtained based on the probability value (s) output by the learned model is acquired as the index value in the step of acquiring an index value.

Mode Item 3

In the cell image analysis method according to mode item 2, the cell image includes cultivated cell that is cultivated in a cultivation container; the learned model is produced by leaning at least one of classification of the cell whether a focus of the cell image is correct when the cell image is captured, classification of the cell whether a coating material on the cultivation container of the cell is proper, and classification of the cell whether the number of cultivation days of the cell is proper; and an index value(s) of at least one of classification of the cell whether a focus of the cell image is correct when the cell image is captured, classification of the cell whether a coating material on the cultivation container of the cell is proper, and classification of the cell whether the number of cultivation days of the cell is/are proper is acquired as the index value in the step of acquiring an index value.

Mode Item 4

In the image analysis method according to mode item 2 or 3, the learned model is produced by learning classification of the cell whether the cell is suitable for analysis whether the cell is a normal or abnormal cell; and a value representing a suitability accuracy for analysis whether the cell that is included in the cell image is a normal or abnormal cell is acquired based on the probability value(s) as the index value in the step of acquiring an index value.

Mode Item 5

In the cell image analysis method according to mode item 4, the learned model is produced by learning classification of the cell whether cells of a common type are suitable for analysis whether each cell is a normal or abnormal cell.

Mode Item 6

In the cell image analysis method according to any of mode items 2 to 5, a step of acquiring a cell area that is an area of the cell included in the cell image is further provided, wherein the representative value of the probability value(s) in the cell area is obtained as the representative value of the probability value(s) in the step of obtaining the representative value of the probability value(s).

Mode Item 7

In the cell image analysis method according to any of mode items 2 to 6, a superimposed cell image that is generated by superimposing numerical data of the representative value of the probability values and a distribution of the probability values on the cell image is displayed in the step of displaying the representative value of the probability value(s).

Mode Item 8

In the cell image analysis method according to mode item 7, a frequency distribution of the probability values is displayed together with the numerical data of the representative value of the probability values and the superimposed cell image in the step of displaying the representative value of the probability value(s).

Mode Item 9

In the cell image analysis method according to any of mode items 2 to 8, an average value of the probability values is obtained as the representative value in the step of obtaining the representative value of the probability value(s).

Mode Item 10

In the cell image analysis method according to any of mode items 1 to 9, a step of producing the learned model by using teacher cell images that are the cell images, and teacher correct images that are generated by adding the cell images with a label value relating to at least two imaging conditions corresponding to the classification or a label value relating to at least two cultivation conditions corresponding to the classification is further provided.

Mode Item 11

In the cell image analysis method according to mode item 10, the learned model is produced by using the teacher correct images that are added with two types of label values corresponding to whether a focus of the cell image is correct when the cell image is captured as the label value relating to the imaging conditions, or at least two types of label values relating to coating materials on a cultivation container in which the cell is cultivated, and the number of cultivation days of the cell as the label value relating to the cultivation conditions in the step of producing the learned model.

Mode Item 12

In the cell image analysis method according to any of mode items 1 to 11, a step of determining whether the index value is greater than a threshold is further provided.

DESCRIPTION OF REFERENCE NUMERALS

6; learned model
10; cell image
20; index value
20*a*; representative value (average)
21; probability value
22, 22*a*, 22*b*; frequency distribution
80; cultivation container
81; cultivation solution
90; cell (cultivated cell)

The invention claimed is:

1. A cell image analysis method comprising:

a step of acquiring a cell image including a cell;

a step of inputting the cell image to a learned model that has learned classification of the cell into one of two or more types;

a step of acquiring an index value indicating accuracy of the classification of the cell that is included in the cell image into one of two or more types based on an analysis result of each of pixels of the cell image output from the learned model; and a step of displaying the acquired index value, wherein the learned model has been learned to output a probability value(s) that is/are an estimation value(s) of the classification for every pixel of the cell image as the analysis result; and a representative value of the probability value(s) obtained based on the probability value(s) output for every pixel of the cell image by the learned model in the step of acquiring an index value.

2. The cell image analysis method according to claim 1, wherein the cell image includes cultivated cell that is cultivated in a cultivation container;

the learned model is produced by leaning at least one of classification of the cell whether a focus of the cell image is correct when the cell image is captured, classification of the cell whether a coating material on the cultivation container of the cell is proper, and classification of the cell whether the number of cultivation days of the cell is proper; and an index value(s) of at least one of classification of the cell whether a focus of the cell image is correct when the cell image is captured, classification of the cell whether a coating material on the cultivation container of the cell is proper, and classification of the cell whether the number of cultivation days of the cell is/are proper is acquired as the index value in the step of acquiring an index value.

3. The cell image analysis method according to claim 1, wherein the learned model is produced by learning classification of the cell whether the cell is suitable for analysis whether the cell is a normal or abnormal cell; and a value representing a suitability degree for analysis whether the cell that is included in the cell image is a normal or abnormal cell is acquired based on the probability value(s) as the index value in the step of acquiring an index value.

4. The cell image analysis method according to claim 3, wherein the learned model is produced by learning classification of the cell whether cells of a common type are suitable for analysis whether each cell is a normal or abnormal cell.

5. The cell image analysis method according to claim 1 further comprising a step of acquiring a cell area that is an area of the cell included in the cell image, wherein the representative value of the probability value(s) in the cell area is obtained as the representative value of the probability value(s) in the step of obtaining the representative value of the probability value(s).

6. The cell image analysis method according to claim 1, wherein a superimposed cell image that is generated by superimposing numerical data of the representative value of the probability values and a distribution of the probability values on the cell image is displayed in the step of displaying the representative value of the probability value(s).

7. The cell image analysis method according to claim 6, wherein a frequency distribution of the probability values is displayed together with the numerical data of the representative value of the probability values and the superimposed cell image in the step of displaying the representative value of the probability value(s).

8. The cell image analysis method according to claim 1, wherein an average value of the probability values is obtained as the representative value in the step of obtaining the representative value of the probability value(s).

9. The cell image analysis method according to claim 1 further comprising a step of producing the learned model by using teacher cell images that are the cell images, and teacher correct images that are generated by adding the cell images with a label value relating to at least two imaging conditions corresponding to the classification or a label value relating to at least two cultivation conditions corresponding to the classification.

10. The cell image analysis method according to claim 9, wherein the learned model is produced by using the teacher correct images that are added with two types of label values corresponding to whether a focus of the cell image is correct when the cell image is captured as the label value relating to the imaging conditions, or at least two types of label values relating to coating materials on a cultivation container in which the cell is cultivated, and the number of cultivation days of the cell as the label value relating to the cultivation conditions in the step of producing the learned model.

11. The cell image analysis method according to claim 1 further comprising a step of determining whether the index value is greater than a threshold.

* * * * *